US006896022B2

(12) United States Patent
Galles et al.

(10) Patent No.: US 6,896,022 B2
(45) Date of Patent: May 24, 2005

(54) METHOD AND APPARATUS FOR ATTACHING CARD LABELS

(75) Inventors: Donald J. Galles, Richfield, MN (US); Gary T. Schultze, Burnsville, MN (US); Robert W. Lundstrom, Plymouth, MN (US)

(73) Assignee: Datacard Corporation, Minnetonka, MN (US)

( * ) Notice: Subject to any disclaimer, the term of this patent is extended or adjusted under 35 U.S.C. 154(b) by 0 days.

(21) Appl. No.: 10/436,379

(22) Filed: May 12, 2003

(65) Prior Publication Data

US 2004/0226650 A1 Nov. 18, 2004

(51) Int. Cl.[7] .......................... B32B 31/00; B32B 35/00

(52) U.S. Cl. ........................................ 156/364; 156/541

(58) Field of Search ................................ 156/247, 249, 156/277, 289, 344, 350, 351, 352, 361–363, 584, DIG. 37, DIG. 42, DIG. 45, 538, 540, 541, 542

(56) References Cited

U.S. PATENT DOCUMENTS

| | | | | |
|---|---|---|---|---|
| 3,690,996 A | | 9/1972 | Rünzi | |
| 3,992,244 A | | 11/1976 | Craig et al. | |
| 4,169,750 A | | 10/1979 | Qwarfort | |
| 4,294,644 A | * | 10/1981 | Anderson | 156/361 |
| 4,840,694 A | * | 6/1989 | Brookman et al. | 156/344 |
| 5,188,696 A | * | 2/1993 | Good, Jr. | 156/361 |
| 5,229,587 A | * | 7/1993 | Kimura et al. | 235/432 |
| 5,306,375 A | | 4/1994 | Leonard | |
| 5,660,676 A | | 8/1997 | Brooks | |
| 6,123,796 A | * | 9/2000 | Kathmann et al. | 156/249 |
| 6,230,780 B1 | * | 5/2001 | Rietheimer | 156/577 |

FOREIGN PATENT DOCUMENTS

| | | |
|---|---|---|
| EP | 1 418 125 A1 | 5/2004 |

* cited by examiner

*Primary Examiner*—Chris Fiorilla
*Assistant Examiner*—Sing P. Chan
(74) *Attorney, Agent, or Firm*—Merchant & Gould P.C.

(57) ABSTRACT

A label affixer shoe, having an application blade with an edge, a first surface, and second surface, and a pivot. The shoe pivots between first and second orientations. The first surface, edge, said second surface separate a label from a liner when the label and liner are moved from the first surface of the shoe past the edge toward the second surface. The shoe may be incorporated into an affixer carriage, also including a pivot actuator. The shoe may be incorporated into an affixer module, with a translation actuator, a card feed mechanism, and a label feed mechanism. When the blade is in the first orientation, the shoe does not obstruct the feeding of the card to or from the label receiving position. The translation of the shoe from the first position to the second position while the blade is in the second orientation applies the label to the card.

60 Claims, 15 Drawing Sheets

METHOD AND APPARATUS FOR ATTACHING CARD LABELS

BACKGROUND OF THE INVENTION

1. Field of the Invention

The invention relates to an applicator shoe for applying labels. More particularly, the invention relates to an applicator shoe that pivots so as to engage and disengage the label recipient during the labeling process.

2. Description of Related Art

The use of separate labels applied to various products is well known. In particular, adhesive-backed labels are often applied to cards, i.e. identification cards, credit cards, transaction cards, etc. Since such cards may be produced in large numbers, it is useful to utilize a tool to apply the labels rather than applying them by hand. In particular, an automated labeling mechanism may be used to apply labels to cards or other products.

Conventionally, adhesive labels often are disposed on a liner, both for convenience of handling and to protect the adhesive from contamination or degradation until the label is applied to the card or other label recipient. The label adheres only weakly to the liner, so that it may be removed conveniently when it is to be applied.

For labels arranged in such a fashion, labeling mechanisms may include an affixer shoe. Conventionally, an affixer shoe is a flat, relatively thin plate or sheet of material, such as sheet steel. When the liner with the label thereon is moved around the shoe, it is required to make a sharp turn as it passes the edge of the shoe. The label tends to separate from the liner at the edge of the shoe, rather than making the turn. Consequently, the adhesive backing of the label is gradually exposed as the liner advances past the edge of the shoe. If the recipient of the label is disposed near the shoe in a position to receive the label, the label may be conveniently transferred from the liner to the label recipient.

For purposes of removing the label and applying it to the label recipient, relative motion between the liner and the shoe edge is required. However, this may be accomplished either by moving the shoe, by moving the liner with the label thereon, or by some combination of the two. In many conventional devices, the shoe is moved instead of the liner and label, however, the effect is the same.

Regardless of which component or components move, in such a manner a label may be readily removed from a liner and applied to a card or other product. When it is desired to place a large number of labels, a long strip or roll of liner with many labels disposed thereon is conventionally used. Cards or other label recipients are fed sequentially into the label receiving position, and the shoe is moved to separate a label from the liner and apply it to each recipient.

When a label is applied, the edge of the shoe should be close to or in contact with the label recipient, so that the label may adhere in the proper position on the recipient as it separates from the liner. However, if the shoe is too close to the label recipient as the recipient is fed to or from the label receiving position, a variety of mishaps may occur, i.e. the apparatus may jam, the label recipient may be damaged, the shoe may be damaged or misaligned, the label may be placed in the wrong position on the recipient or may not be applied properly or at all, etc.

Therefore, it is conventional to translate the shoe between first and second positions. In the first position the shoe is well clear of the label receiving position so that the label recipient may be fed thereto or therefrom. In the second position the shoe is arranged with the edge near to or in contact with the label recipient. The shoe is disposed in the first position except when labels actually are being applied, during which time the shoe is in the second position.

However, this arrangement has several limitations.

For example, the second position wherein the shoe is clear of the label recipient normally is a considerable distance from the first position wherein the shoe is proximate the label recipient. Consequently, a relatively large translation is necessary on each stroke between the first and second positions, so as to keep the shoe clear of the transport path for the label recipient when the recipient is moved in and out of the label receiving position.

A schematic illustration of this difficulty is shown in FIG. 1. In FIG. 1A, a conventional label module 10 includes a shoe 12. As may be seen, the conventional shoe 12 is merely a flat sheet of material, as might be made by punching or cutting a blank of sheet metal. Guide rollers 14 and 16 help guide a liner 18 with labels thereon (not shown). As shown, the shoe 12 is arranged well above the card 20 so as not to interfere with the feeding of the card 20 into or out of the module 10. Thus, in FIG. 1A the shoe 12 is in the first position.

FIG. 1B shows the same conventional label module 10 with the shoe 12 in the second position, ready to apply a label to the card 20.

As may be seen, the stroke that the conventional shoe 12 must follow between its first and second positions is relatively long, at least on the order of the height of the card and possibly much longer. For example, although for clarity FIG. 1 shows only the shoe 12 and the guide rollers 14 and 16, the module 10 may include various other components as well, i.e. gear trains, actuators, etc. Some of these components may move with the shoe 12, and they must also be translated well clear of the card 20. Likewise, whatever mechanism is used to feed the card 20 may include components that extend past the card 20 itself in one or more directions, and it may also be necessary for the shoe 12 to translate clear of those components.

The time required to translate the shoe over such a long stroke necessarily limits the speed of operation, i.e. in number of labels applied per hour, of a conventional labeling apparatus.

Furthermore, because the stroke is long, an apparatus suited for even moderate speeds may require relatively high-performance components, i.e. high-speed motors, etc. Such high-performance components may be expensive, difficult to manufacture, etc., and so may increase the cost and/or complexity of the system.

In addition, as may be noted from a comparison of FIGS. 1A and 1B, the amount of liner 18 that is disposed between the guide rollers 14 and 16 is much less in the first position than in the second position. In order to keep loose gathers of liner 18 from interfering with feeding the card 20 or other operations, the liner 18 must be retracted and retained under tension.

If the liner 18 is not retracted from both sides, i.e. in the direction of both roller 14 and roller 16, the position of the liner 18 with respect to the edge 22 of the shoe 12 will change. In that case, the position of the next label on the liner 18 with respect to the edge 22 will also change. This may reduce the accuracy of label placement. For this reason, the liner 18 must be retracted with relatively high precision on both sides of the shoe 12. Thus, for a conventional label module 10 one or more precisely controllable reversible motors are required on both the supply side and the take-up side of the shoe 12.

The need to use such high precision reversible motors and the drive trains, controllers, etc. necessary to support them may increase the cost and/or complexity of a conventional label module 10.

Furthermore, even with high precision motors, the relatively large translation that the shoe 12 must make may introduce a greater potential for errors in positioning the liner 18 with respect to the edge 22 and/or the card 20. This is turn may lead to inaccuracies in label placement. Also, even if arrangements are made to compensate for such inaccuracies, those arrangements may further increase the cost and complexity of a conventional label module 10. Likewise, such arrangements may further reduce the speed of a conventional label module 10, since adjustment of the liner 18 to compensate for positioning errors may require time.

SUMMARY OF THE INVENTION

It is the purpose of the present invention to overcome these difficulties, thereby providing an improved label applicator and a method for using the same. More particularly, it is the purpose of the present invention to enable rapid, accurate placement of labels on cards or other label recipients without undue mechanical complexity in the label applicator.

It is noted that the terms "orientation" and "position" are not used interchangeably herein. The terms "pivot" and "orientation" are used herein with reference to rotational motions, i.e. around an axis. By contrast, the terms "translate" and "position" are used with reference to overall displacements, i.e. from one point along a line to another point along that line.

An exemplary embodiment of a label affixer shoe in accordance with the principles of the claimed invention includes an application blade with an edge, a first surface, and a second surface. A pivot is connected to the blade, the pivot defining a pivot axis therethrough.

The pivot is arranged such that at least the blade is pivotable about the pivot axis between a first orientation and a second orientation. Pivoting the blade from the first position to the second position causes a lateral displacement of the edge in a direction of the second surface.

The first surface, the edge, and the second surface are configured so as to separate a label from a liner at the edge when the label and the liner are moved with respect to the blade from the first surface past the edge toward the second surface.

The first surface of the blade may be convex, and the second surface may be planar.

The pivot may be in the form of a cylinder projecting from the shoe parallel with said second surface.

The shoe may include a stop arranged so as to limit the range between the first and the orientations. The stop may be in the form of a cylinder projecting from the shoe parallel with the pivot axis. The stop may be arranged such that the range between the first and second positions is at least 5 degrees, or at least 10 degrees.

The shoe may include a linking body, with the blade and pivot attached thereto.

The shoe may include at least a portion of a registration sensor for registering the position of the label. The sensor may include a light pipe head disposed on the shoe.

An exemplary embodiment of a label affixer carriage in accordance with the principles of the claimed invention includes an affixer shoe. The affixer shoe includes an application blade with an edge, a first surface, and a second surface. A pivot is connected to the blade, the pivot defining a pivot axis therethrough.

The pivot is arranged such that at least the blade is pivotable about the pivot axis between a first orientation and a second orientation. Pivoting the blade from the first position to the second position causes a lateral displacement of the edge in a direction of the second surface.

The first surface, the edge, and the second surface are configured so as to separate a label from a liner at the edge when the label and the liner are moved with respect to the blade from the first surface past the edge toward the second surface.

The affixer carriage also includes a pivot actuator for pivoting the blade between the first and second orientations.

The carriage may include a stop arranged so as to limit the range between the first and second orientations.

The carriage also may include a biasing mechanism for applying pressure to the label in a direction from the first surface of the shoe to the second surface of the shoe, i.e. in the direction of the recipient. The biasing mechanism may be engaged with the shoe and move therewith. The biasing mechanism may include a brush.

The carriage may include at least a portion of a label registration sensor for registering the position of the label. At least a portion of the sensor may be disposed on the shoe. More particularly, at least a portion of the sensor may be disposed on the blade. The registration sensor may include a light source, first and second light pipes, and an intensity detector. A head of one of the light pipes may be disposed on the blade.

The pivot actuator may be a solenoid.

An exemplary embodiment of a label affixer module in accordance with the principles of the claimed invention includes an application blade with an edge, a first surface, and a second surface. A pivot is connected to the blade, the pivot defining a pivot axis therethrough.

The pivot is arranged such that at least the blade is pivotable about the pivot axis between a first orientation and a second orientation. Pivoting the blade from the first position to the second position causes a lateral displacement of the edge in a direction of the second surface.

The first surface, the edge, and the second surface are configured so as to separate a label from a liner at the edge when the label and the liner are moved with respect to the blade from the first surface past the edge toward the second surface.

The label module also includes a pivot actuator for pivoting the blade between the first and second orientations.

The label module further includes a translation actuator for translating the shoe between a first position and a second position.

The label module includes a recipient feed mechanism for delivering a label recipient, such as a card, to a label receiving position proximate the second side of the blade. In addition, the label module includes a label feed mechanism for delivering the label on the liner to a label applying position proximate the first side of the blade.

The shoe, the label receiving position, and the label applying position are arranged so as to function as follows.

When the blade is in the first orientation, the shoe does not obstruct the recipient as it moves to or from the label receiving position within the recipient feed mechanism.

When the recipient is in the label receiving position, the label is in the label applying position, the blade is in the second orientation, and the shoe is in the first position, the edge of the blade engages a first edge of the label with the recipient.

Likewise, when said recipient is in said label receiving position, and the shoe has moved to the second position while the blade is in the second orientation, the edge of the blade engages a second edge of the label with the recipient.

Thus, the translation of the shoe from the first position to the second position while the blade is in the second orientation applies the label to the recipient.

The carriage may include a stop arranged so as to limit the range between the first and the orientations. The stop may be arranged so that the range is at least 5 degrees, or at least 10 degrees.

The label module also may include a biasing mechanism for applying pressure to the label in the direction of the recipient. The biasing mechanism may be engaged with the shoe and move therewith. The biasing mechanism may include a brush.

The label module may include a label registration sensor for registering the position of the label. At least a portion of the sensor may be disposed on the shoe. More particularly, at least a portion of the sensor may be disposed on the blade. The registration sensor may include a light source, first and second light pipes, and an intensity detector. A head of one of the light pipes may be disposed on the blade.

The registration sensor may be in communication with the label feed mechanism, such that the label feed mechanism feeds the label to the label applying position in response to the registration sensor.

The distance of the translation between the first and second positions of the shoe may be such that it is not more than the height of the label. The distance of the translation may be equal to the height of the label.

The label feed mechanism may include a supply mechanism for supplying the label and the liner, and a take-up mechanism for taking up the liner after the label is separated therefrom.

The supply mechanism may require only a single supply actuator. Similarly, the take-up mechanism may require only a single take-up actuator. The supply actuator and/or the take-up actuator may be a unidirectional motor.

The supply mechanism may include a supply spindle. The supply mechanism also may include a guide roller for guiding the liner and the label. The supply mechanism may include a pinch roller engaged with the guide roller and actuated by the supply actuator, so that the pinch roller and the guide roller draw the liner and label toward the shoe. The guide roller may be unpowered.

The take-up mechanism may include a take-up spindle for taking up the liner. The take-up mechanism also may include a guide roller for guiding the liner as it moves away from the shoe. The take-up mechanism may include a capstan roller engaged with the liner to draw the liner from the shoe. The capstan roller may be actuated by the take-up actuator. The guide roller may be unpowered.

The pivot actuator may be a solenoid. The translation actuator may be an electric motor.

The translation actuator may move the shoe between the first and second positions and a third position, wherein when the shoe is in the third position, the shoe is not disposed in the loading path of the label feed mechanism.

The recipient may be planar in shape. More particularly, the recipient may be a card.

The label module may have a labeling rate of more than 1200 labels per hour. The label module may have a labeling rate of at least 3000 labels per hour. The pivotable blade in the label module may enable a higher labeling rate than would be enabled with a non-pivotable blade. The pivotable blade in the label module may enable a higher accuracy of label placement than would be enabled with a non-pivotable blade.

An exemplary embodiment method for affixing a label to a label recipient in accordance with the principles of the claimed invention includes providing an affixer shoe. The shoe has application blade with an edge, a first surface, and a second surface. A pivot is connected to the blade, the pivot defining a pivot axis therethrough.

The pivot is arranged such that at least the blade is pivotable about the pivot axis between a first orientation and a second orientation. Pivoting the blade from the first position to the second position causes a lateral displacement of the edge in a direction of the second surface.

The first surface, the edge, and the second surface are configured so as to separate a label from a liner at the edge when the label and the liner are moved with respect to the blade from the first surface past the edge toward the second surface.

The method includes feeding the label on the liner to a label applying position proximate the first side of the blade, and feeding a label recipient to a label receiving position proximate the second side of the blade.

The blade is pivoted from the first orientation to the second orientation such that the edge engages a first edge of the label with the recipient. The shoe is translated from a first position to a second position with the blade in the second orientation, such that in the second position the edge engages a second edge of the label with the recipient. In this manner, the label is applied to the recipient.

The blade is pivoted from the second orientation back to the first orientation such that the shoe does not obstruct the feeding of the recipient to or from the label receiving position. The shoe is translated from the second position back to the first position with the blade in the first orientation.

The method includes removing the label recipient from the label receiving position.

There may be a plurality of labels disposed consecutively on the liner.

The liner may be locked when the label is being applied to the recipient. The liner may be passed between a guide roller and a pinch roller before the label reaches the label applying position, and the pinch roller may be locked to lock the liner. The liner and labels may be fed by actuating the pinch roller. The actuator for the pinch roller may be the only actuator used to feed the label to the label applying position.

The liner may be taken-up from the label applying position as the label is applied to the recipient. The liner may be taken up by actuating a capstan roller that is in contact with the liner. The actuator for the capstan roller may be the only actuator used to take-up the label from the label applying position.

The method may include sensing the registration of the label to determine whether the label is in the label applying position. At least a portion of a registration sensor for sensing the registration of the label may be disposed on the shoe. More particularly, at least a portion of the sensor for sensing the registration of the label may be disposed on the blade. The registration sensor may include light source, first and second light pipes, and an intensity detector. The head of one of the light pipes may be disposed on the blade. The feeding of the label to the label applying position may be controlled based on the registration of the label as sensed.

The distance of the translation between the first and second positions of the shoe may be not more than a height of the label. The distance of translation may be equal to the height of the label.

The range between the first and second orientations may be at least 5 degrees, or may be at least 10 degrees.

The method may be repeated more than 1200 times per hour. The method may be repeated at least 3000 times per hour. The speed of label application enabled by pivoting the blade may be greater than the speed of application with a non-pivoting blade.

The accuracy of label placement enabled by pivoting the blade may be greater than the accuracy of placement with a non-pivoting blade.

BRIEF DESCRIPTION OF THE DRAWINGS

Like reference numbers generally indicate corresponding elements in the figures.

DETAILED DESCRIPTION OF THE PREFERRED EMBODIMENT

Figure 1B:
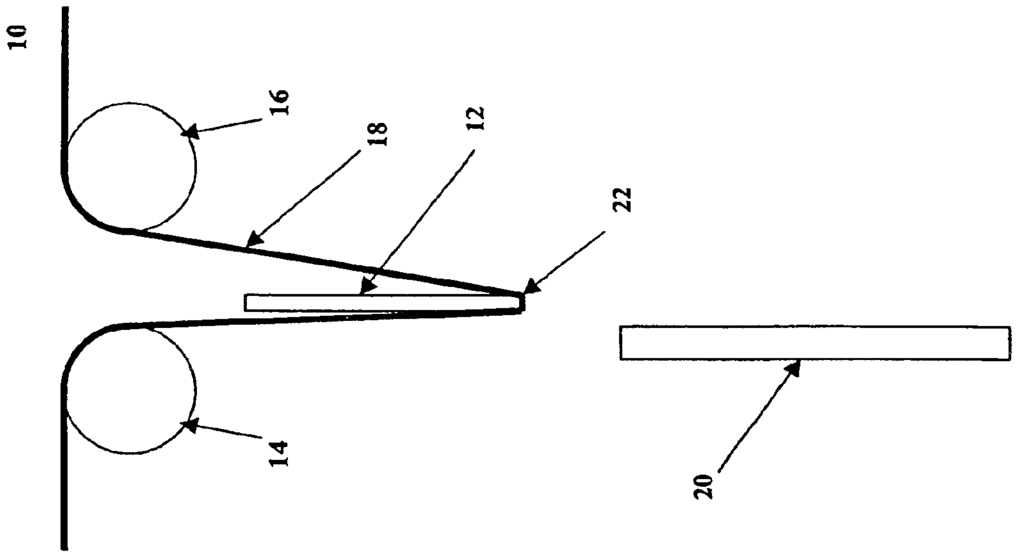
Figure 1B PRIOR ART
FIG. 1 is a schematic illustration showing an arrangement of a conventional label applicator shoe as known from the prior art.
Figure 1A:
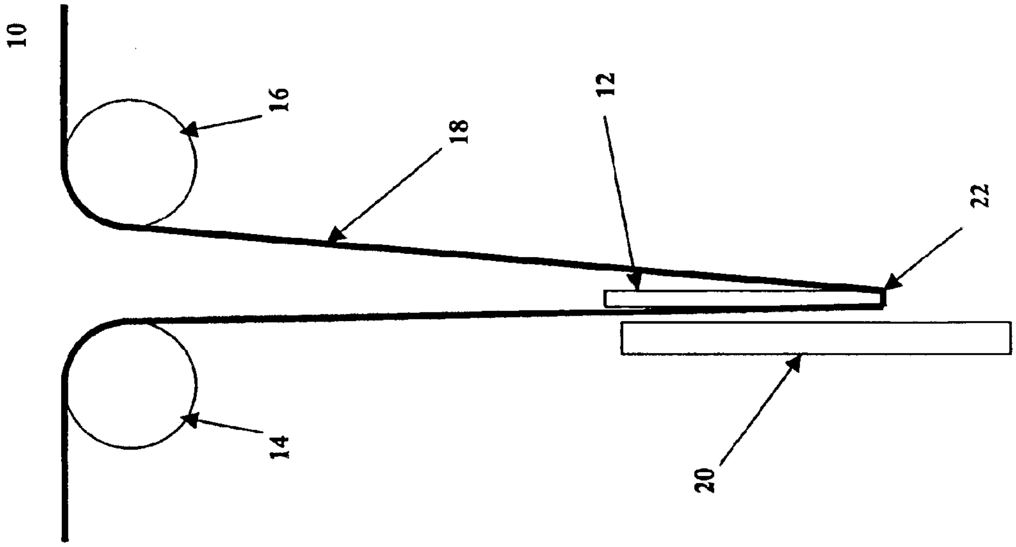
Figure 1A PRIOR ART
Figure 2:
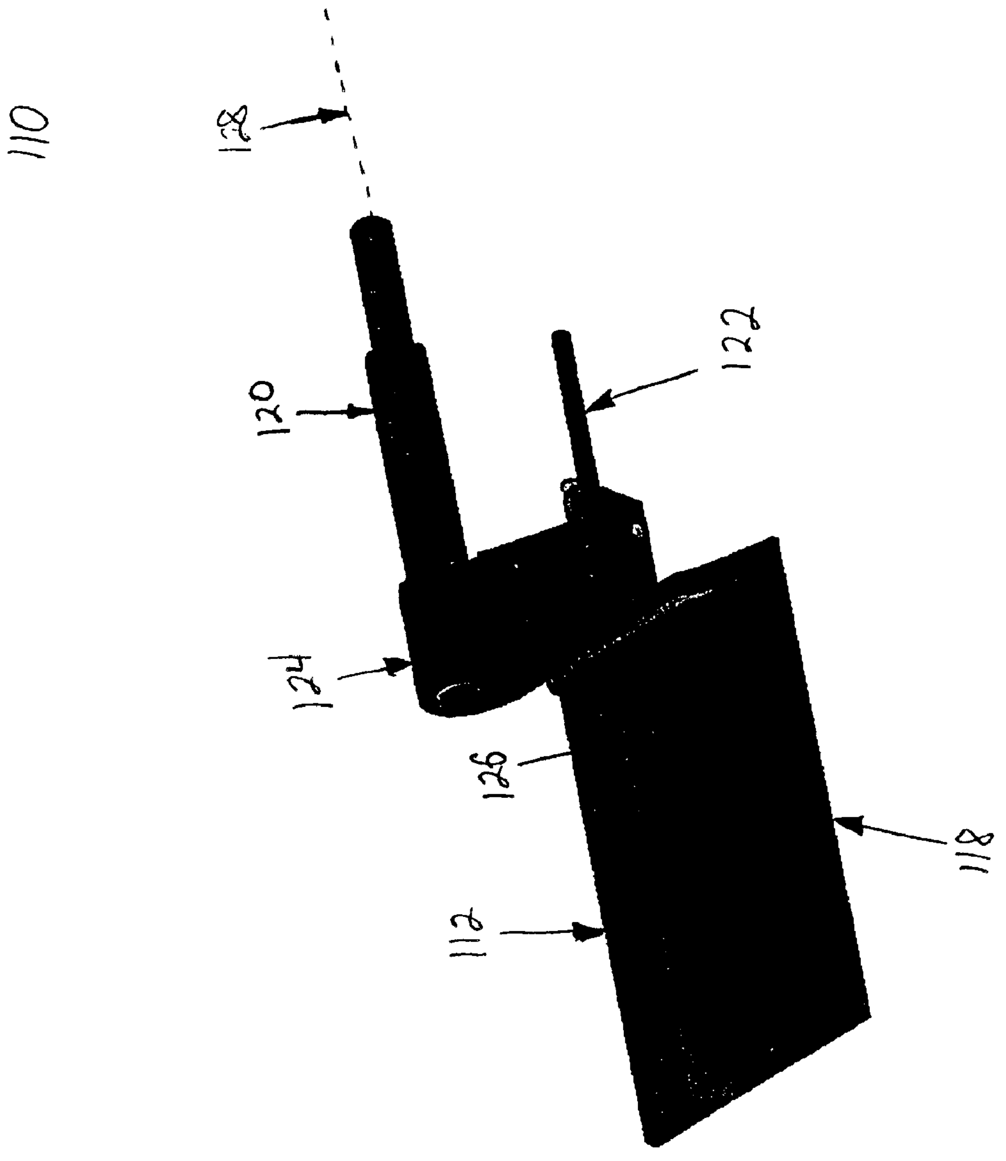
FIG. 2 is a perspective view of an exemplary embodiment of a label affixer shoe in accordance with the principles of the present invention, showing the first surface.
Figure 3:
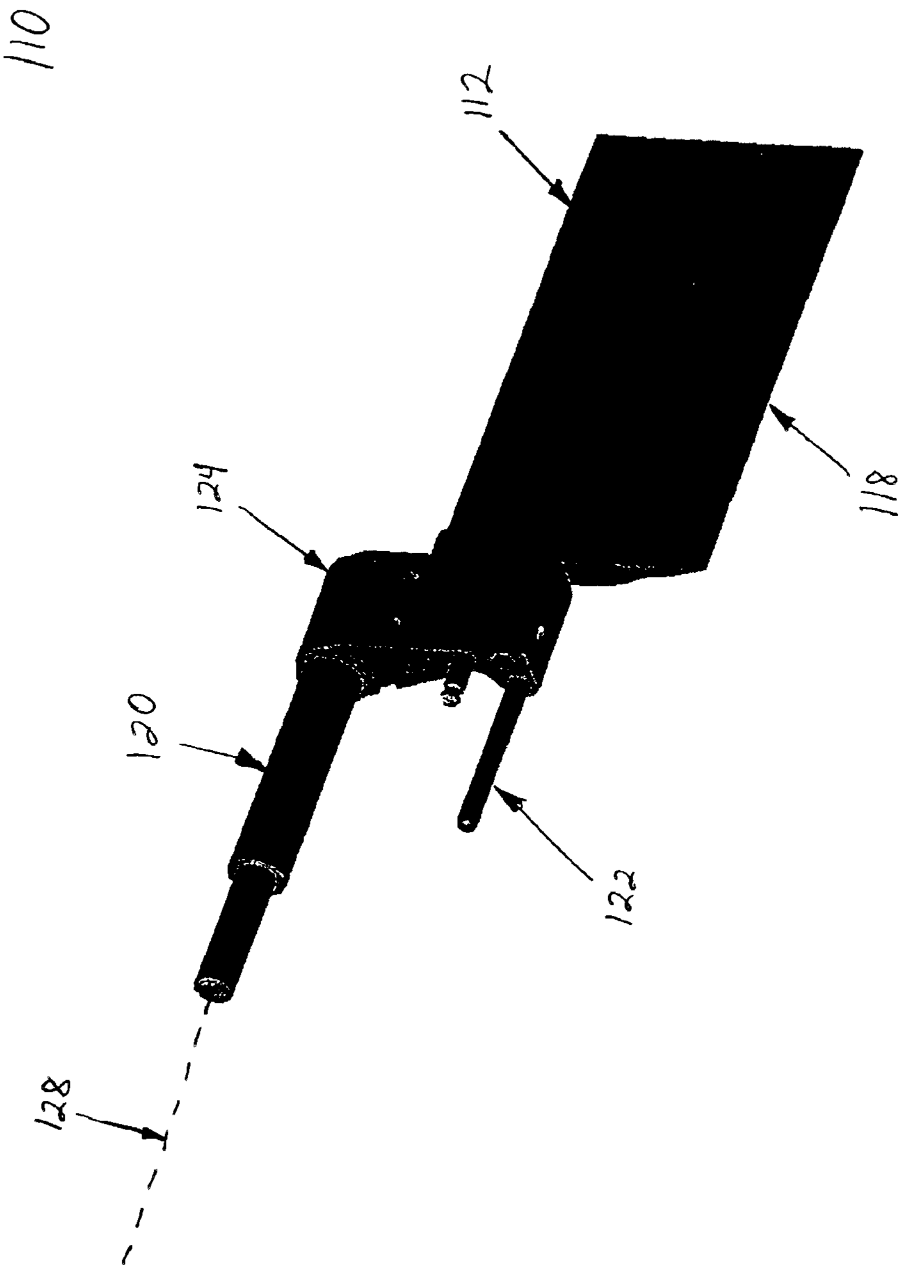
FIG. 3 is another perspective view of the shoe of FIG. 2, showing the second surface.
Figure 4:
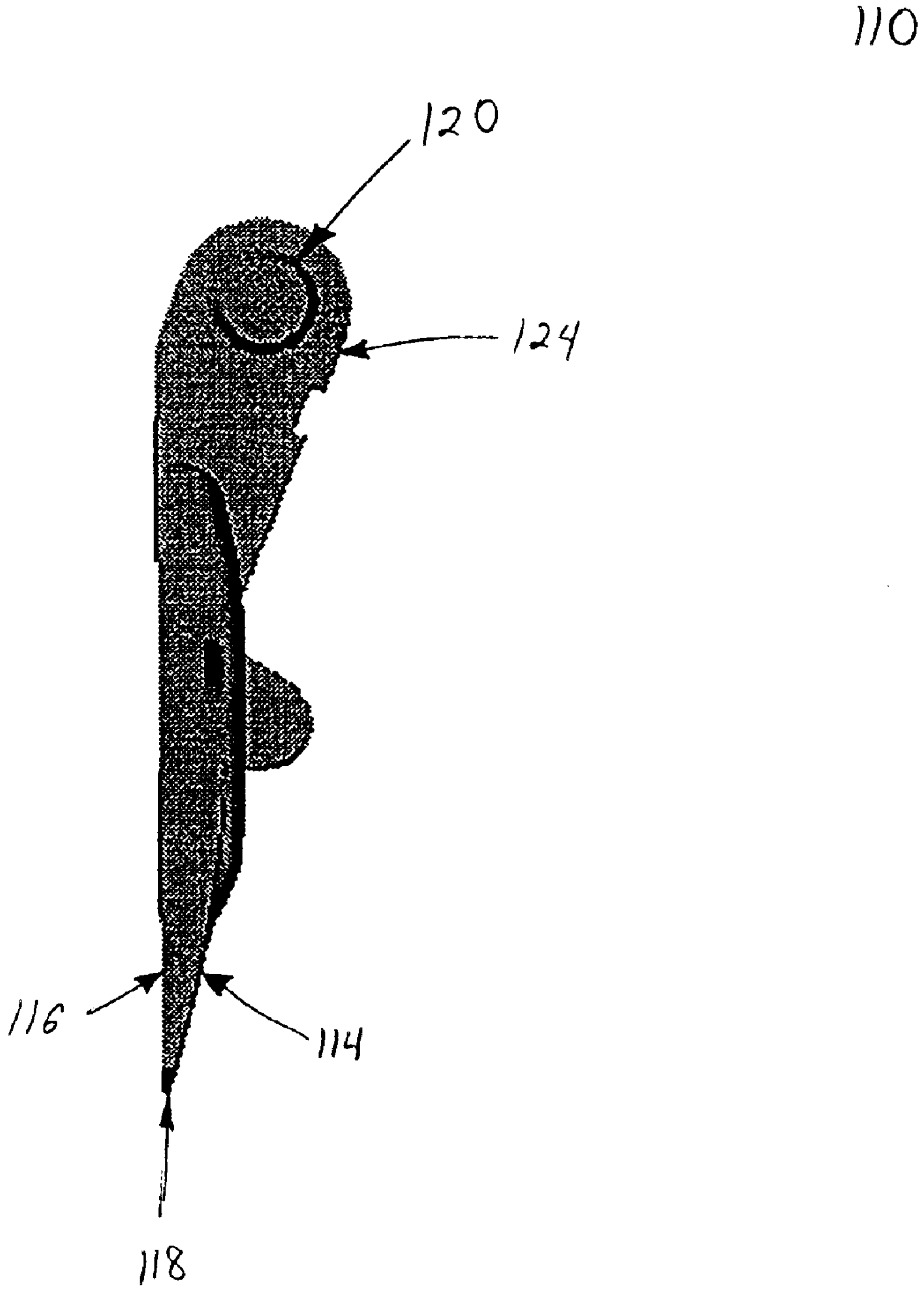
FIG. 4 is a side view of the shoe of FIG. 2.

FIGS. 2–4 show an exemplary label affixer shoe 110. The shoe 110 includes a blade 112. The blade has a first surface 114 and a second surface 116, and an edge 118.

The first surface 114, edge 118, and second surface 116 are configured such that a very sharp turn is necessary for any material passing over the edge 118 from the first surface 114 to the second surface 116. In this configuration, if a liner with a label (not shown in FIGS. 2–4) thereon is made to move from the first surface 114 over the edge 118 to the second surface 116, the label will tend to separate from the liner.

Separating a label from a liner by passing the combination over an edge in this fashion is known in itself, and is not described further herein.

As illustrated, the first surface 114 is convex, and the second surface 116 is planar. Also as illustrated, the first and second surfaces 114 and 116 are arranged at an angle of approximately 10 degrees with respect to one another in the vicinity of the edge 118. However, this arrangement is exemplary only. It may be equally suitable to arrange the first and second surfaces 114 and 116 at another angle, or to arrange them parallel. Likewise, although the blade 112 overall is shown to have a particular three-dimensional form, with a convex first surface 114 and a planar second surface 116, this also is exemplary only. Other forms, including but not limited to a flat sheet or plate of material, may be equally suitable for the blade 112.

The shoe 110 includes a pivot 120 connected with the blade 112. The pivot 120 defines a pivot axis 128. At least the blade 112 of the shoe pivots about the pivot axis 128, so that the blade 112 may be pivoted between first and second orientations. When the blade 112 pivots from the first to the second position, it does so in the direction of the second surface, so that the edge 118 is displaced in the direction of the second surface.

In the embodiment illustrated in FIGS. 2–4, the shoe 110 is rigidly constructed so as to form a single piece. Thus, when the blade 112 pivots about the pivot axis 128, the remainder of the shoe 110 also pivots about the pivot axis 128. However, such an arrangement is exemplary only. For example, in other embodiments, the shoe 110 may be made in two or more pieces, i.e. the blade 112 may be movably joined with the pivot 120 rather than rigidly joined, so that the two are separate pieces. Other arrangements also may be equally suitable, so long as the blade 112 itself is pivotable.

As shown, the pivot 120 is in the form of a cylindrical projection extending from the shoe parallel with the second surface 116. However, this arrangement is exemplary only. Other configurations for the pivot 120 may be equally suitable.

The shoe 110 may include a stop 122 arranged so as to limit the range of motion between the first and second positions of the blade 112. For example, as shown the shoe 110 includes a cylindrical stop 122 projecting from the shoe 110 parallel with the second surface 116. Such a structure can readily be used to engage fixtures, components in a larger apparatus, etc. so as to obstruct the blade 112 from pivoting outside of the desired range. For example, the stop 122 could be so arranged as to limit a range of motion between the first and second positions to 5 degrees, or 10 degrees, or some other desired value. However, such an arrangement is exemplary only. Other stops 122 or the absence of any stop 122 may be equally suitable.

The shoe 110 may include a linking body 124 arranged between the pivot 120 and the blade 112. That is, the pivot 120 may be connected indirectly to the blade 112 via some other structure, referred to herein as a linking body 124. In embodiments that include a linking body 124, other elements, including but not limited to a stop 122, may also be attached to the linking body 124, although this is exemplary only.

The shoe 110 may include at least a portion of a registration sensor for sensing the presence and/or proper position of a label in the vicinity of the shoe 110. For example, as illustrated the shoe 110 includes a light pipe head 126 of the sort used for a photo-sensor. The light pipe head 126 is disposed in a groove on the first side 114 of the blade 112, as shown. However, this arrangement is exemplary only. Other sensors and/or portions of sensors may be equally suitable, and may suitably be arranged on other portions of the shoe 110.

A label affixer shoe 110 in accordance with the principles of the present invention may be incorporated into a larger assembly, such as a labeling carriage. FIGS. 5–8 show an exemplary label affixer carriage 150. The carriage 150 includes an affixer shoe 110.

For exemplary purposes, the shoe 110 in the carriage 150 illustrated and described herein is the shoe 110 described above. However, the carriage 150 is not limited only to the specific embodiment of the shoe 110 described above, nor is the shoe 110 above limited in its use to only a carriage 150 as described herein.

In addition to the shoe 110, the carriage 150 includes a pivot actuator 152 for pivoting the shoe 110 between its first and second orientations. A variety of actuators may be suitable for use as the pivot actuators 152, including but not limited to electric, pneumatic, and hydraulic actuators. As shown, the pivot actuator 152 is a solenoid, but this is exemplary only. Suitable actuators are well-known, and are not described further herein.

Figure 5:
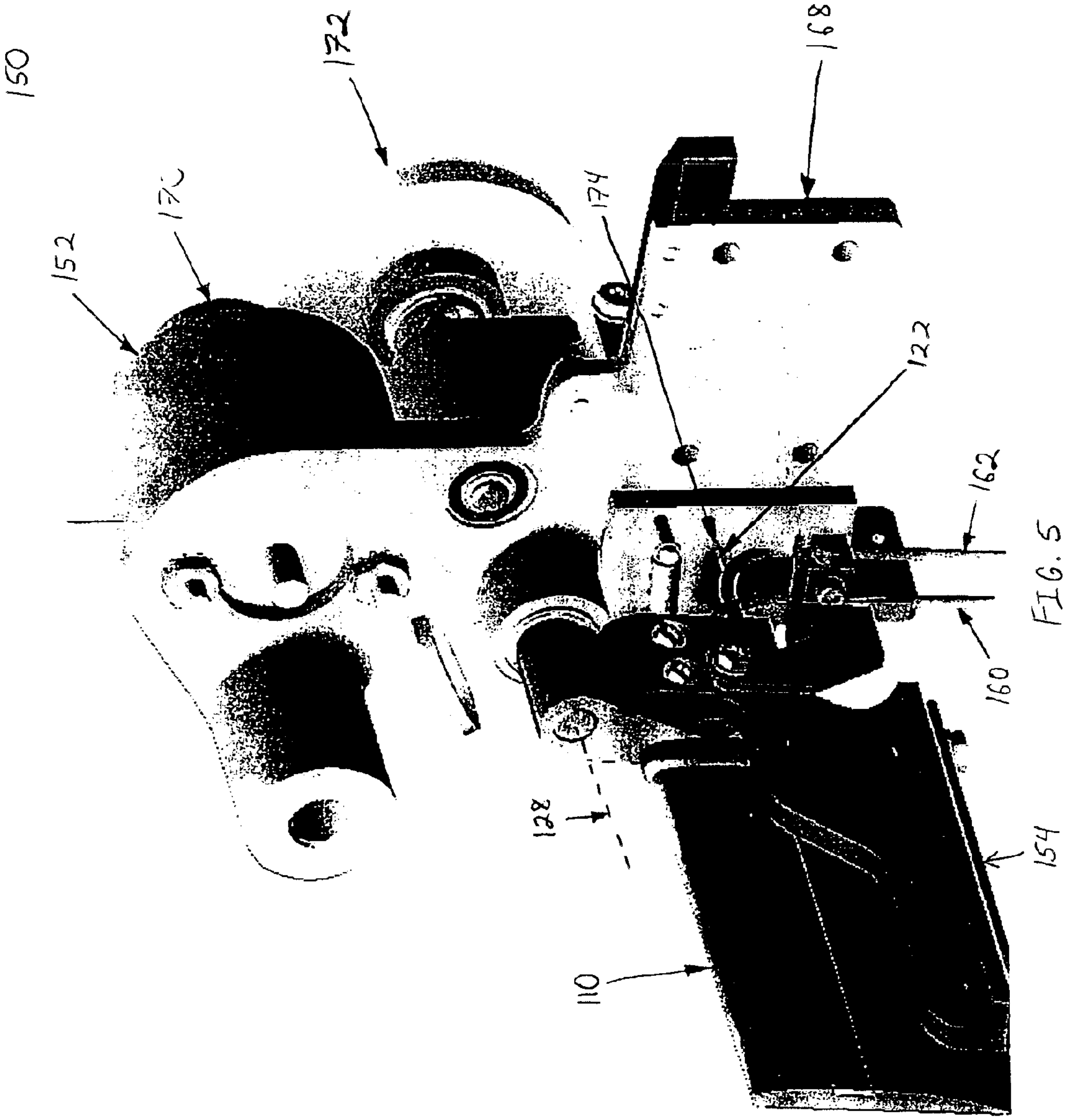
FIG. 5 is a perspective view of an exemplary embodiment of a label affixer carriage in accordance with the principles of the present invention.
Figure 6:
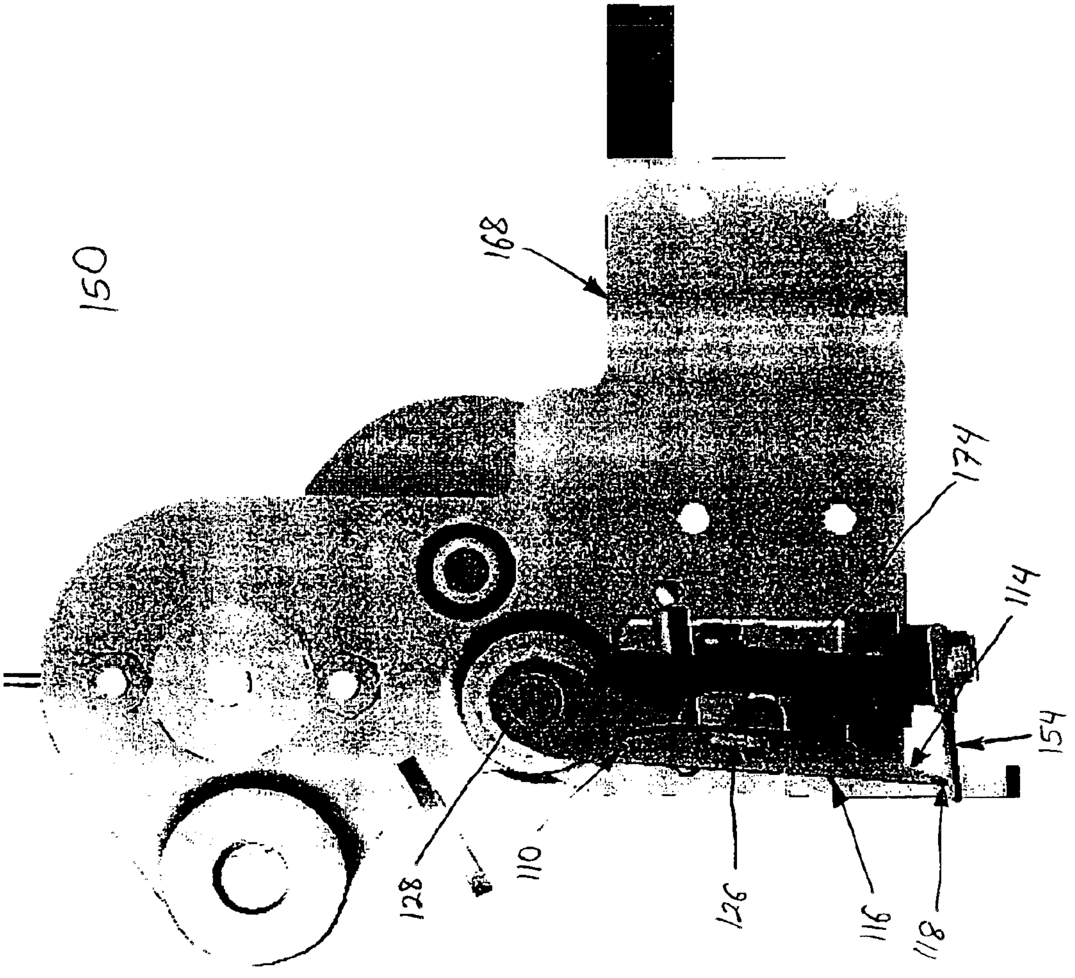
FIG. 6 is a side view of the carriage of FIG. 5.

The pivot actuator 152 may be engaged with the shoe 110 in a variety of fashions. As shown in FIG. 5, the pivot actuator 152 engages a first pivot gear 170, which in turn engages a second pivot gear 172, which engages the pivot 120 (not visible in FIG. 5). Thus, the pivot actuator 152 turns the first and second pivot gears 170 and 172, so as to indirectly cause the shoe 110 to pivot. However, this arrangement is exemplary only. Other arrangements for engaging the pivot actuator 152 and the shoe 110, including but not limited to direct engagement, may be equally suitable. Gear systems and other direct and indirect arrangements for engaging the pivot actuator 152 and the shoe 110 are well known, and are not further described herein.

In the exemplary carriage 150 illustrated, the shoe 110 is supported by a frame 168. The pivot 120 of the shoe 110 passes through the frame 168, with the second pivot gear 172 on the far side. Similarly, as illustrated the pivot actuator 152 is supported by the frame 168 by being bolted thereto. However, both this particular arrangement and the presence of the frame 168 itself is exemplary only. For some embodiments of the carriage 150, a different frame 168 or no frame at all may be equally suitable.

As previously described with regard to the shoe 110 itself, the shoe 110 may include a stop 122 arranged to limit the range of motion between the first and second orientations. An exemplary arrangement by which the stop 122 limits the motion of the shoe 110 is shown in FIG. 5. In the embodiment illustrated in FIG. 5, the frame 168 defines a groove 174 therein, with the stop 122 disposed within the groove 174. Thus, the stop 122 limits the range of motion of the shoe 110 by cooperating with the frame 168, in particular by abutting against the ends of the groove 174. However, this arrangement is exemplary only. Other arrangements by which the stop 122 limits the range of motion of the shoe 110 to between the first and second orientations may be equally suitable.

The carriage 150 may include a biasing mechanism 154 for applying pressure to a label in the direction of a recipient as the label is applied thereto. An exemplary biasing mechanism 154 is most easily visible in FIG. 6. The manner in which labels are applied is described in detail below. However, as previously described, a label is separated from its liner as it passes from the first surface 114 of the shoe 110 over the edge 118 to the second surface 116. The biasing mechanism 154 serves to bias the label against the recipient as the label is applied thereto, so that the label is securely adhered to the recipient.

In the exemplary embodiment illustrated, the biasing mechanism 154 is a brush, with its bristles extending from the first surface of the shoe 114 past the edge 118 in the direction of the second surface 116. The brush is mounted on a biasing mechanism support 174, which in turn is connected with the shoe 110. Thus, as shown the biasing mechanism 154 is engaged with the shoe 110, so as to move, i.e. pivot, therewith. However, both the use of a brush as the biasing mechanism 154 and this arrangement are exemplary only, and other biasing mechanisms 154 and arrangements may be equally suitable.

Figure 7B:
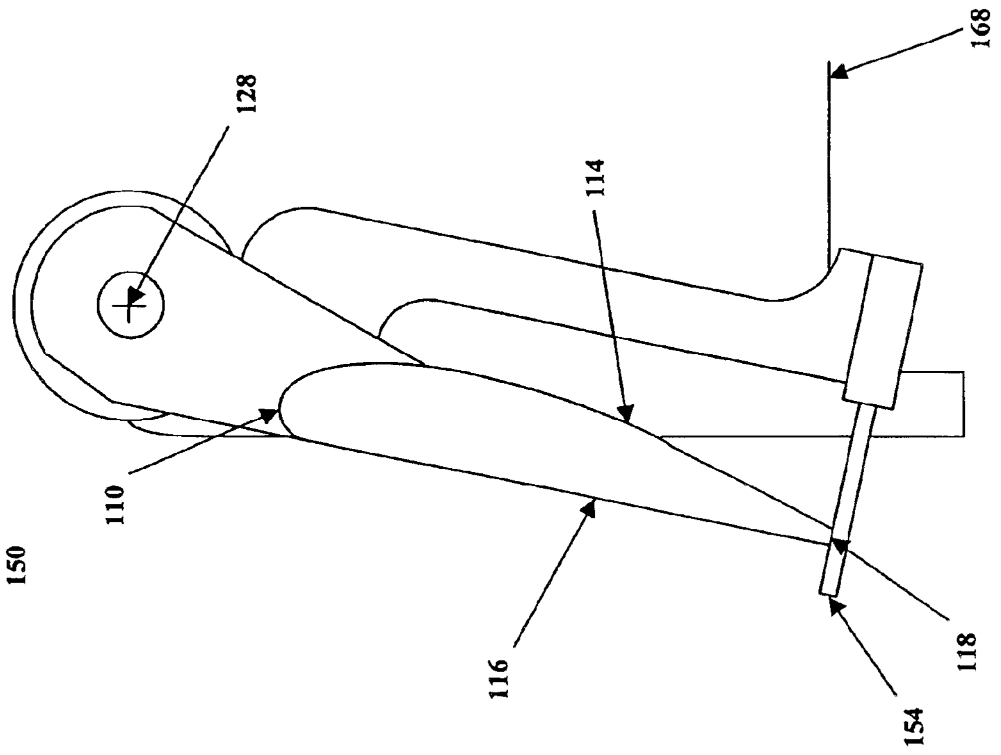
FIG. 7 is a schematic illustration showing an exemplary embodiment of a shoe in accordance with the principles of the present invention in its first and second orientations.
Figure 7A:
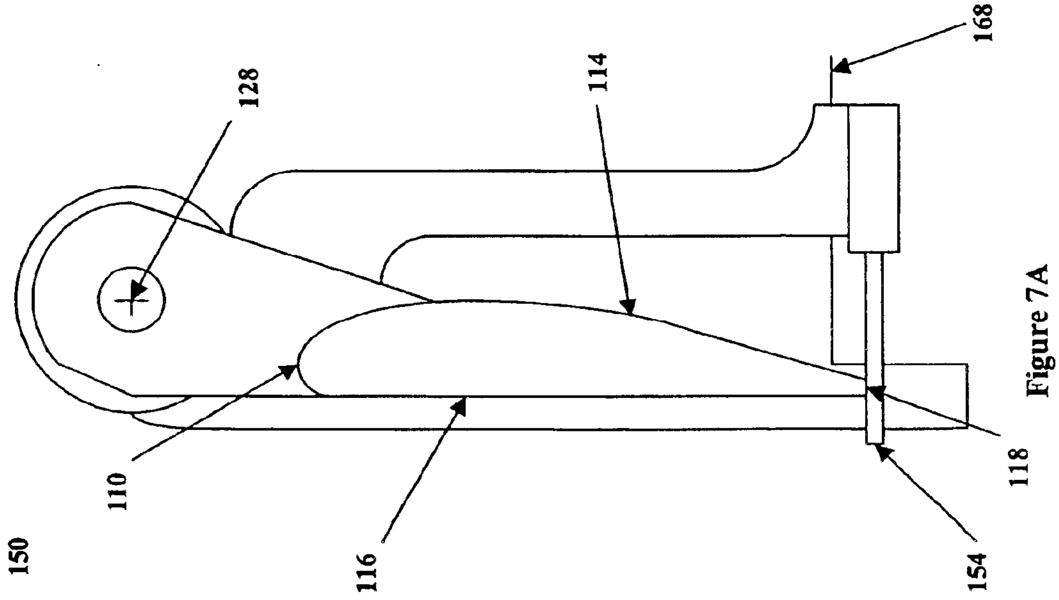

FIG. 7 shows in schematic form the pivoting movement of the shoe 110 within the carriage 150. FIG. 7A shows the shoe 110 in its first orientation, and FIG. 7B shows the shoe in its second orientation. As may be seen, at least the blade 112 of the shoe 110, and in the case illustrated the whole of the shoe 110, pivots about the pivot axis 128 between the first and second orientations. A portion of the frame 168 of the carriage 150 is illustrated for reference.

As may also be seen, pivoting the blade 112 from the first orientation to the second orientation causes the edge 118 to be displaced laterally in the direction of the second surface 116.

It is noted that the angles illustrated in FIGS. 7A and 7B are exemplary only. For purposes of illustration, in FIG. 7A the shoe 110 is shown with the second surface 116 oriented vertically. Likewise, in FIG. 7B the shoe 110 is shown with the second surface 116 at an angle of approximately 15 degrees. The relative angles in the first and second orientations may be less than, equal to, or greater than that shown. Similarly, the absolute angular orientation of the shoe 110 may be different from the exemplary angles shown for the first and second orientations in FIGS. 7A and 7B.

The carriage 150 may include at least a portion of a label registration sensor 156 for registering the position of a label with respect to the shoe 110. As previously described, and as is visible in FIG. 6, the shoe 110 may include a portion of the registration sensor 156, such as a light pipe head 126.

Figure 8:
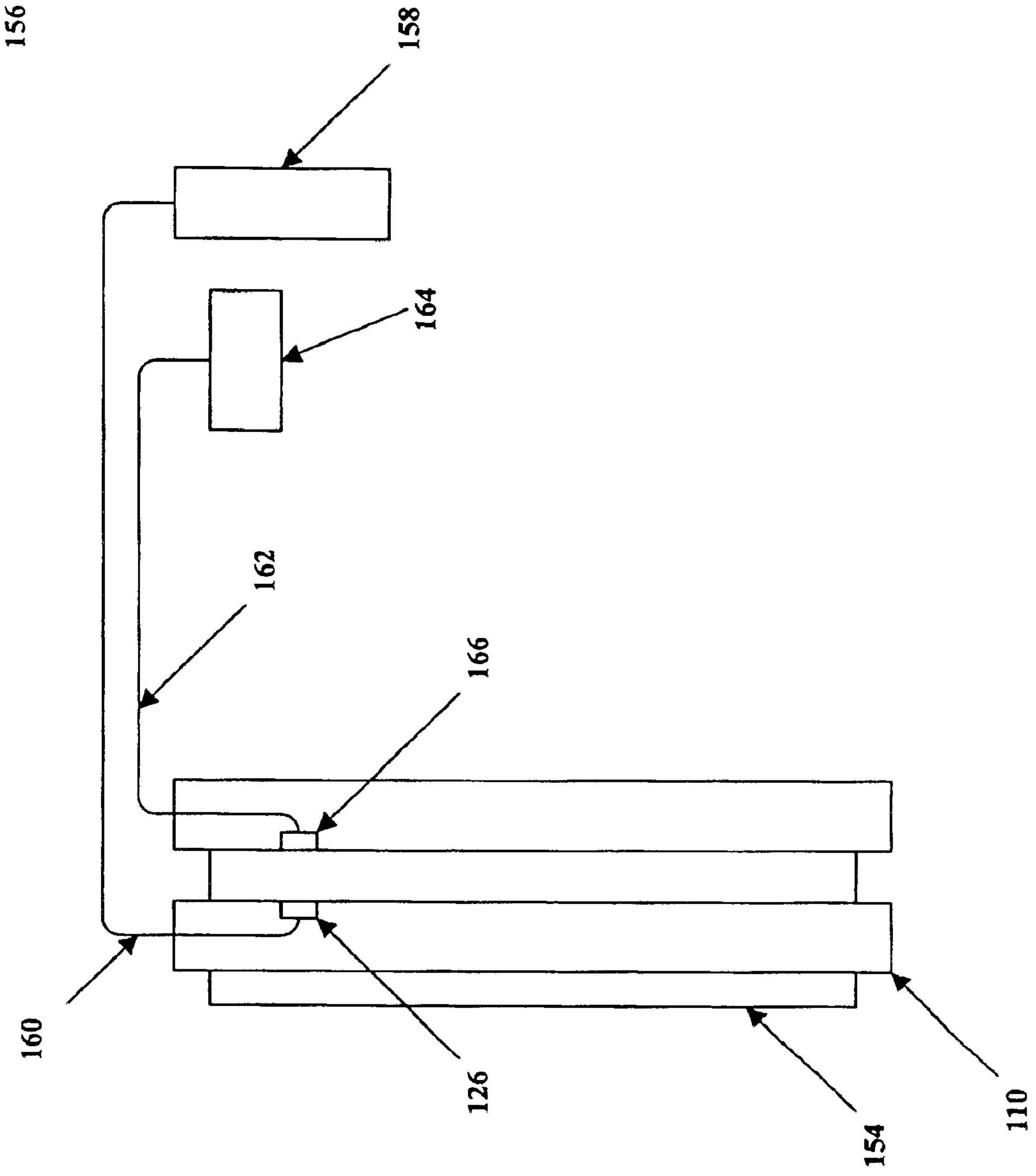
FIG. 8 is a schematic illustration showing a registration sensor.

FIG. 8 shows a schematic illustration of an exemplary registration sensor 156. A light source 158 emits light, which travels along a first light pipe 160 to a first light pipe head 126 disposed on the shoe 110. Light then passes through the gap between the shoe and the support 174 for the biasing mechanism 154 to a second light pipe head 166 disposed thereon. The light continues to travel through a second light pipe 162 to an intensity detector 164, which measures the intensity of the light.

Commonly, a liner for supporting labels passes light more readily than a combination of liner and label. Thus, where labels are disposed on the liner, the combination typically transmits more light. Thus, if a label is present within the gap between the first and second light pipe heads 126 and 166, i.e. en route to the edge 118 of the shoe 110, the intensity of light received by the detector 164 will be lower than if no label is present. When the edge of the label obstructs the path between the first and second light pipe heads 126 and 166, the detected light intensity changes.

Thus, the presence and registration position of a label may be determined, so as to support proper positioning of the label on the label recipient.

However, such an arrangement is exemplary only, and other registration sensors 156 and/or other arrangements for the reference sensor 156 may be equally suitable.

In particular, it is noted that although the reference sensor 156 is described herein with respect to the carriage 150, not all components of the sensor 156 need be disposed physically on the carriage 150. With reference to FIG. 8, for example, if the light pipes 160 and 162 are relatively long, the light source 158 and detector 164 may be a substantial distance physically from the shoe 110.

A label affixer shoe 110 in accordance with the principles of the present invention may be incorporated into a still larger assembly, such as a labeling module. Likewise, a label affixer carriage 150 may be incorporated into a labeling module or other larger assembly. FIGS. 9–16 show an exemplary label affixer module 200. The module 200 includes an affixer shoe 110.

For exemplary purposes, the shoe 110 in the module 200 illustrated and described herein is the shoe 110 described above. However, the module 200 is not limited only to the specific embodiment of the shoe 110 described above, nor is the shoe 110 described above limited in its use to only a module 200 as described herein.

Likewise, although elements similar to those of the exemplary carriage 150 described above are illustrated and described with respect to the module 200, the module 200 is not limited only to the specific embodiment of the carriage 150 described above, nor is the carriage 150 described above limited in its use to only a module 200 as described herein.

In addition to the shoe 110, the module 200 includes a pivot actuator 152 for pivoting the shoe 110 between its first and second orientations, as that described previously with regard to the carriage 150.

The module 200 also includes a translation actuator 202 for translating the shoe 110 between first and second positions. The translation of the shoe 110 is in addition to, and is an independent motion from, the pivoting of the shoe 110. Thus, as described in greater detail below, the shoe 110 may pivot without translating, and/or may translate without pivoting.

Figure 9:
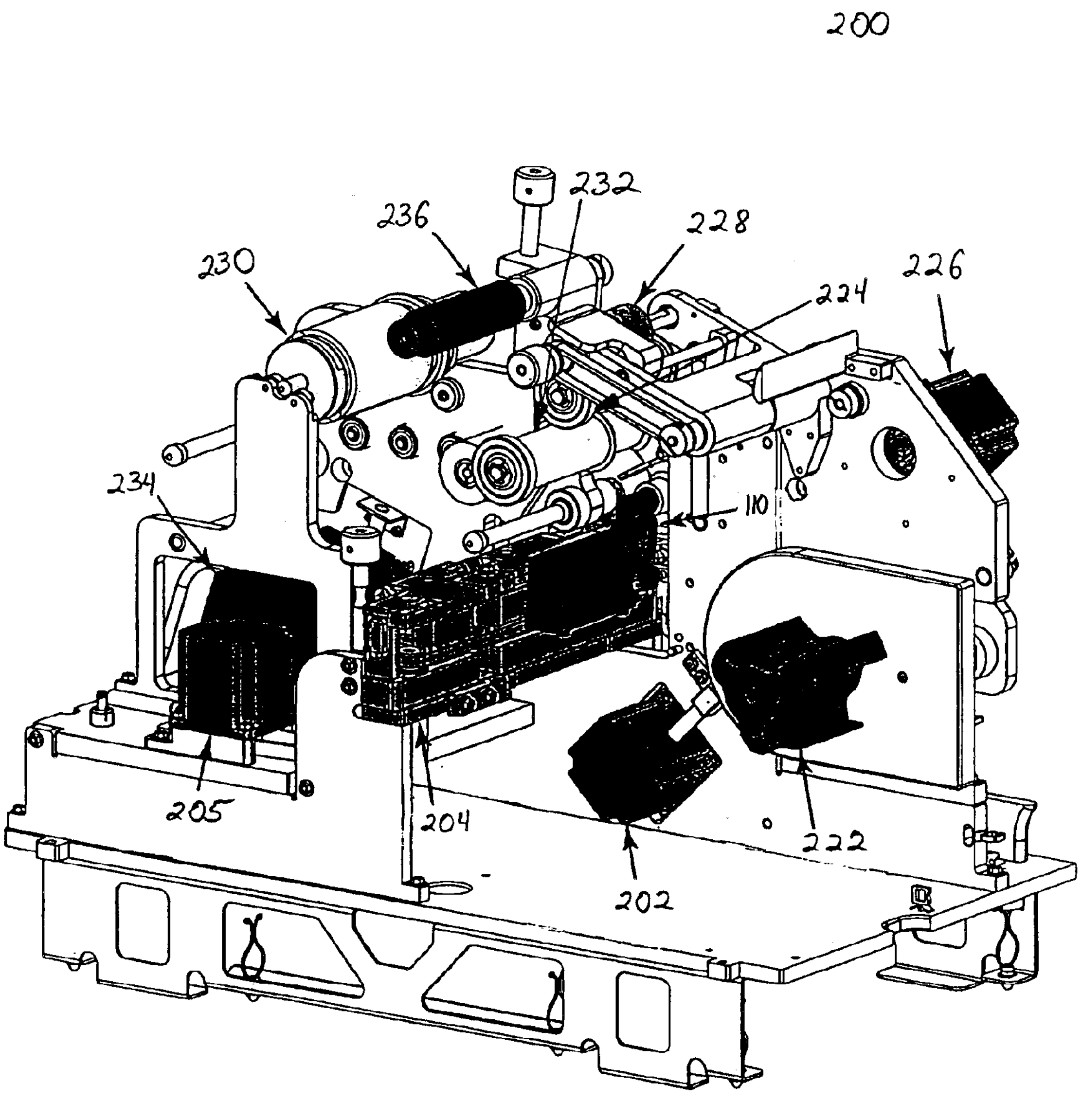
FIG. 9 is a perspective view of an exemplary embodiment of a label applicator module in accordance with the principles of the present invention.
Figure 10:
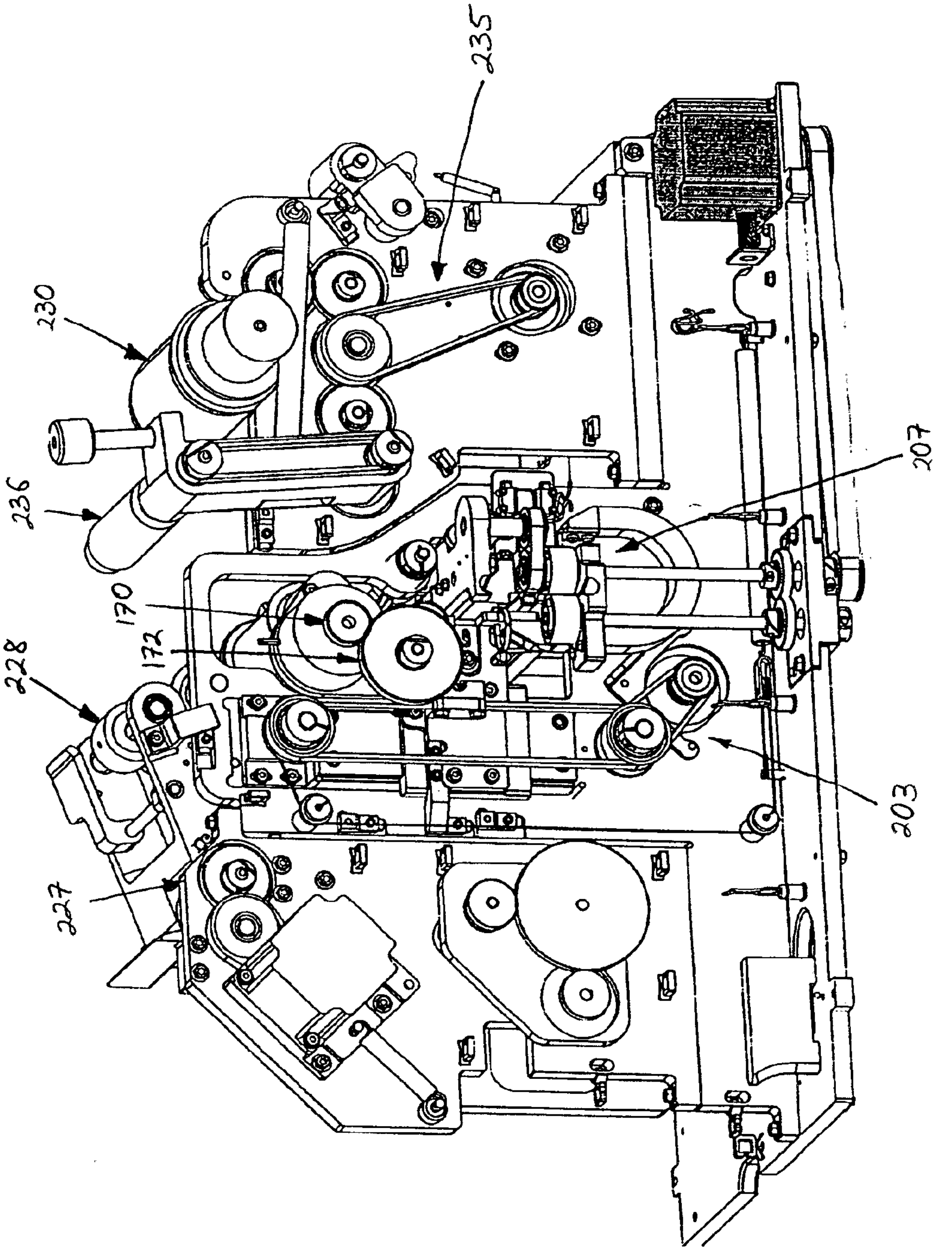
FIG. 10 is another perspective view of the label module of FIG. 9.

A variety of actuators may be suitable for use as the translation actuator 202. As illustrated in FIG. 9, the translation actuator 202 is an electric motor. However, this is exemplary only. Suitable translation actuators 202 include but are not limited to electric, pneumatic, and hydraulic actuators.

The translation actuator 202 also may be engaged with the shoe 110 in a variety of manners. The exemplary module 200 illustrated in FIG. 10 includes an arrangement of wheels and belts, which are referred to collectively herein as the translation actuator transmission 203. The translation actuator transmission 203 transmits motion from the translation actuator 202 to the shoe 110. However, this arrangement is exemplary only. Other arrangements, including but not limited to arrangements with direct engagement between the shoe 110 and the translation actuator 202, may be equally suitable.

Returning to FIG. 9, the module includes a recipient feed mechanism 204 for feeding a label recipient 206 to and from a label receiving position, where a label 210 is applied thereto.

Figure 13:
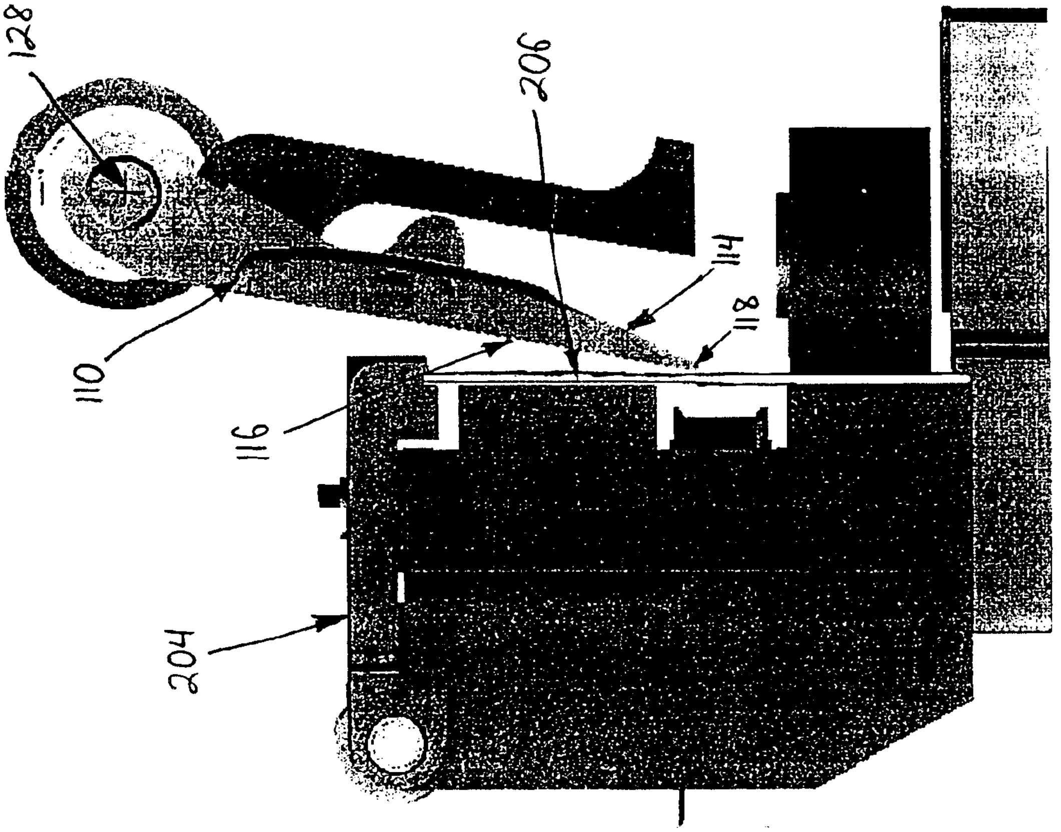
FIG. 13 is a side view of an exemplary embodiment of a label applicator module in accordance with the principles of the present invention immediately before label application.

A variety of label recipients 206 may be suitable for use with the label module 200. As illustrated in FIG. 13, the label recipient 206 is a flat card, such as a credit card, transaction card, or identification card. However, this is exemplary only. Other recipients 206, including but not limited to other generally planar recipients 206, may be equally suitable. Cards and other recipients are well known, and are not described further herein.

The recipient feed mechanism 204 likewise may take a variety of forms, depending at least in part on the particular recipient 206 that is to be fed. As shown in FIGS. 9 and 13, the recipient feed mechanism 204 is a card transport assembly, suited for transporting cards to and from the proximity of the shoe 110. However, this is exemplary only, and other recipient feed mechanisms 204 may be equally suitable. Recipient feed mechanisms are well known, and are not described further herein.

Typically, the recipient feed mechanism 204 is actuated by a recipient feed actuator 205, as illustrated for example in FIG. 9. A variety of actuators may be suitable for use as the recipient feed actuator 205. As illustrated in FIG. 9, the recipient feed actuator 205 is an electric motor. However, this is exemplary only. Suitable recipient feed actuator 205 include but are not limited to electric, pneumatic, and hydraulic actuators.

The recipient feed actuator 205 also may be engaged with the recipient feed mechanism 204 in a variety of manners. The exemplary module 200 illustrated in FIG. 10 includes an arrangement of wheels and rods, which are referred to collectively herein as the recipient feed actuator transmission 207. The recipient feed actuator transmission 207 transmits motion from the recipient feed actuator 205 to the recipient feed mechanism 204. However, this arrangement is exemplary only. Other arrangements, including but not limited to arrangements with direct engagement between the recipient feed mechanism 204 and the recipient feed actuator 205, may be equally suitable.

In addition, it is noted that for certain embodiments a recipient feed actuator 205 and/or its associated transmission 207 may not be included in the module 200. For example, an actuator and transmission may be incorporated in another device to which the module is engaged, the recipient feed mechanism 204 may be passively fed, i.e. by gravity, etc.

The module 200 also includes a label feed mechanism. The label feed mechanism feeds labels 210 disposed on a liner 216 to a label applying position where the label 210 may be applied to the recipient 206.

In certain embodiments such as that illustrated and described herein, the label feed mechanism consists of several elements distributed across the module 200. For example, it will be appreciated that when a plurality of labels 210 is arranged sequentially on a long strip of liner 216, and are fed through the module 200, the various elements making up the label feed mechanism may be separated spatially while still being engaged with one another. For this reason, the term "label feed mechanism" is used herein to collectively represent a group of other numbered elements, as described below, and is defined functionally herein as noted above, but is not identified by a reference number itself.

As shown in the exemplary embodiment illustrated in FIG. 9, the label module may include a supply spindle 222. As may also be seen in FIG. 11, the supply spindle 222 accepts a roll of liner 216 with labels 210 disposed thereon for convenient distribution to the shoe 110.

However, such an arrangement is exemplary only. Labels 210 may be supplied to the shoe 110 other than from a supply spindle 222, and in forms other than on a roll.

Suitable arrangements include, but are not limited to, stacks of individual labels 210 on individual liners 216.

The supply spindle 222 may include a clutch or similar braking mechanism to help keep the liner 216 under tension, so as to inhibit "wandering" of the liner 216 and labels 210 thereon from their proper path through the module 200. However, this is exemplary only.

The label module may include a guide roller 224 and a pinch roller 228 engaged therewith for engaging the liner 216 therebetween, to guide and draw the liner 216 with the labels 210 thereon into their label applying position proximate the shoe 110. The pinch roller 228 may be actuated by a supply actuator 226, so that the pinch roller 228 moves under the power of the supply actuator 226.

For some arrangements, such as the one described immediately above, only a single supply actuator 226 is required. For example, since the only actuated element in the above arrangement is the pinch roller 228, only one supply actuator 226 is required to supply labels 210 to the shoe 110.

A variety of actuators may be suitable for use as the supply actuator 226. As illustrated in FIG. 9, the supply actuator 226 is an electric motor. However, this is exemplary only. Suitable supply actuator 226 include but are not limited to electric, pneumatic, and hydraulic actuators.

The supply actuator 226 also may be engaged with the pinch roller 228 in a variety of manners. The exemplary module 200 illustrated in FIG. 10 includes an arrangement of wheels, which are referred to collectively herein as the supply actuator transmission 227. The supply actuator transmission 227 transmits motion from the supply actuator 226 to the pinch roller 228. However, this arrangement is exemplary only. Other arrangements, including but not limited to arrangements with direct engagement between the pinch roller 228 and the supply actuator 226, may be equally suitable.

In addition, the use of a pinch roller 228 and guide roller 224 are themselves exemplary only, and other mechanisms may be used to draw the liner 216 with the labels 210 thereon into their label applying position proximate the shoe 110.

Supply spindles 222, pinch rollers 228, and guide rollers 224 and similar structures are well known, and are not described further herein.

As also shown in the exemplary embodiment illustrated in FIG. 9, the label module may include a take-up spindle 230. As may also be seen in FIG. 11, the take-up spindle 230 functions to conveniently take-up a roll of liner 216 from the shoe 110 after the labels 210 have been separated therefrom.

However, such an arrangement is exemplary only. The liner 216 may be removed from the shoe 110 other than by using a take-up spindle 230, and in forms other than on a roll. For example, the liner 216 may simply be discarded, i.e. directed to a waste bin, as it exits the vicinity of the shoe 110. Other arrangements also may be equally suitable.

The take-up spindle 230 may include a clutch or similar braking mechanism to help keep the liner 216 under tension. However, this is exemplary only.

The label module 200 may include a guide roller 232 for guiding the liner 216 from the label applying position proximate the shoe 110.

In some embodiments, the guide roller 232 may be engaged with the shoe 110 so as to translate therewith as the shoe 110 moves between the first and second positions. However, this is exemplary only, and arrangements wherein the guide roller 232 is fixed, or moves otherwise than with the shoe 110, may be equally suitable.

In addition, the label module 200 may include a capstan roller 236 engaged with the liner 216 for drawing the liner 216 from their label applying position proximate the shoe 110. The capstan roller 236 may be actuated by a take-up actuator 234, so that the capstan roller 236 moves under the power of the take-up actuator 234.

For some arrangements, such as the one described immediately above, only a single take-up actuator 234 is required. For example, since the only actuated element in the above arrangement is the capstan roller 236, only one take-up actuator 234 is required to draw the liner 216 from the shoe 110.

Even in embodiments wherein another element is also actuated, a single take-up actuator 234 may be sufficient. For example, the take-up spindle 230 could also be actuated by the same 234 actuator. Since the capstan roller 236 and the take-up spindle are turning in the same direction, and are moving at least approximately at the same rate, such an arrangement could be made in a mechanically simple fashion. Regardless of the mechanical linkage, in such an instance a single take-up actuator 234 still would be sufficient.

A variety of actuators may be suitable for use as the take-up actuator 234. As illustrated in FIG. 9, the take-up actuator 234 is an electric motor. However, this is exemplary only. Suitable take-up actuator 234 include but are not limited to electric, pneumatic, and hydraulic actuators.

The take-up actuator 234 also may be engaged with the capstan roller 236 in a variety of manners. The exemplary module 200 illustrated in FIG. 10 includes an arrangement of wheels and belts, which are referred to collectively herein as the take-up actuator transmission 235. The take-up actuator transmission 235 transmits motion from the take-up actuator 234 to the capstan roller 236. However, this arrangement is exemplary only. Other arrangements, including but not limited to arrangements with direct engagement between the capstan roller 236 and the take-up actuator 234, may be equally suitable.

In addition, the use of a capstan roller 236 is in itself exemplary only, and other mechanisms may be used to draw the liner 216 from their label applying position proximate the shoe 110.

Take-up spindles 230, capstan rollers 236, and guide rollers 232 and similar structures are well known, and are not described further herein.

As indicated above, the term "label feed mechanism" is collective, and functionally defined. In the exemplary embodiment illustrated herein and described above, the label feed mechanism includes the supply spindle 222, guide roller 224, supply actuator 226, supply actuator transmission 227, pinch roller 228, take-up spindle 230, guide roller 232, take-up actuator 234, take-up actuator transmission 235, and capstan roller 236. Although these various elements are spatially separated, they act in concert to perform the function of feeding labels 210 on a liner 216 through the module 200, and so may be considered a collective whole.

However, this arrangement for the label feed mechanism is exemplary only, and the label feed mechanism is not limited only to embodiments having those particular elements. In other embodiments, the label feed mechanism may be made up of other elements providing similar overall functionality to that described.

The label feed mechanism may be considered to include two smaller assemblies therein, the supply mechanism and the take-up mechanism. Similarly, the terms "supply mechanism" are collective terms, referring to a group of elements based on their function. In the exemplary embodiment illustrated and described herein, the elements of the supply mechanism act together to feed the liner 216 with the labels 210 thereon to the label applying position near the shoe 110. Likewise the elements of the take-up mechanism act together to feed the liner 216 from the label applying position near the shoe 110.

Again, in the exemplary embodiment illustrated herein and described above, the supply mechanism includes the supply spindle 222, guide roller 224, supply actuator 226, supply actuator transmission 227, and pinch roller 228, while the take-up mechanism includes the take-up spindle 230, guide roller 232, take-up actuator 234, take-up actuator transmission 235, and capstan roller 236.

However, these arrangements are exemplary only, and the supply mechanism and take-up mechanism are not limited only to embodiments having those particular elements. In other embodiments, the supply mechanism and take-up mechanism may be made up of other elements providing similar overall functionality to that described.

FIG. 12 shows a sequence of label application for the exemplary embodiment herein described. FIG. 12A shows the shoe 110 in its first orientation and its first position. A portion of the recipient feed mechanism 204 is also illustrated for reference.

As shown, the label liner 216 extends from the first surface 114 of the shoe 110 past the edge 118 to the second surface 116. A label 210 is disposed on the liner 216. The label 210 is advanced to a label application position with respect to the shoe 110, wherein it is in position for separation from the liner 216 and application to a label recipient 206. The label recipient 206 similarly is in a label receiving position, wherein it is in position to receive the label 210. In the position shown in FIG. 12A, the label 210 is already beginning to separate from the liner 216, with the leading or first edge 212 of the label exposed and ready to engage the recipient 206.

Figure 12D:
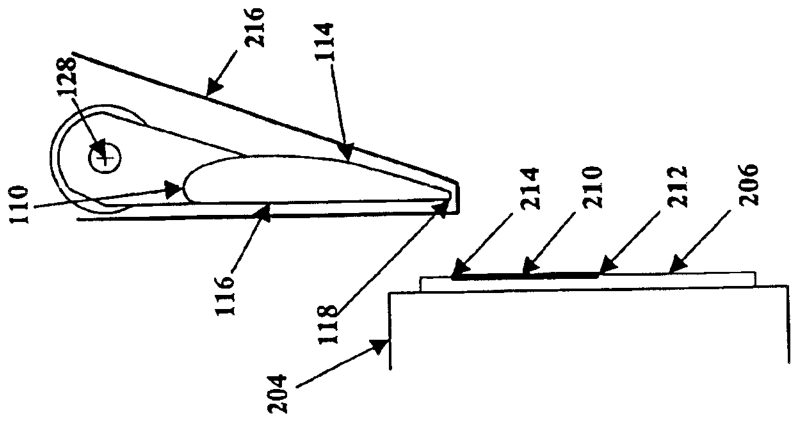
FIG. 12 is a schematic illustration showing a sequence of label application in accordance with the principles of the present invention.
Figure 12C:
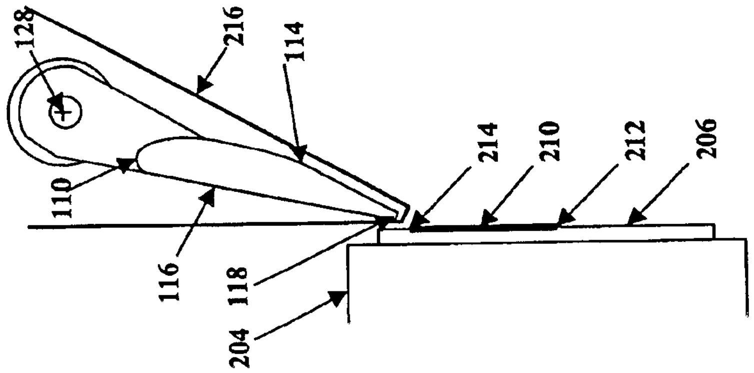
Figure 12B:
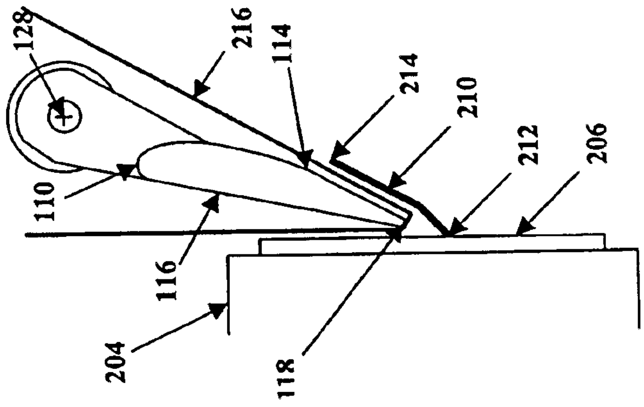
Figure 12A:
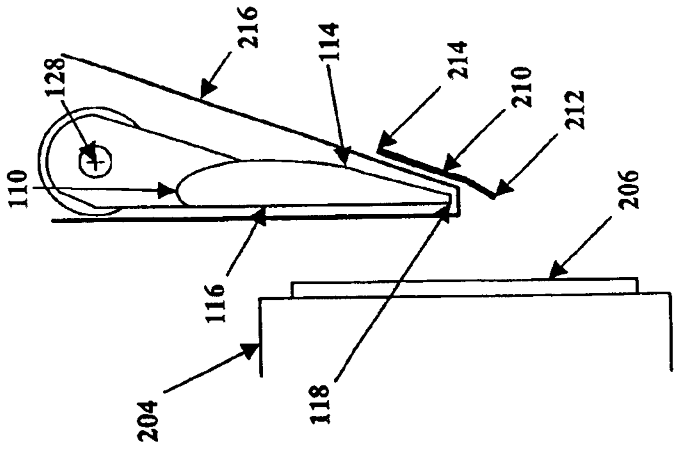

As may be seen, with the shoe 110 in the first position as in FIG. 12A, the shoe 110, in particular the edge 118 where the label 210 is to separate from the liner 216, is well clear of the label recipient 206. Thus, the label feed mechanism 204 may feed the recipient 206 along its transport path into the label receiving position as shown without obstruction from the shoe 110.

FIG. 12B shows the shoe 110 in its second orientation, pivoted so that the edge 118 is laterally displaced in the direction of the second surface 116. The shoe 110 is still in its first position.

In this orientation, the edge 118 of the shoe 110 engages the first edge 212 of the label 210 with the recipient 206. As is described above, in some embodiments a biasing mechanism 154 such as a brush may be used to bias the label 210 in the direction of the recipient 206, so as to promote a good bond between the label 210 and the recipient 206. However, as also indicated above the biasing mechanism 154 is exemplary, and is omitted from FIGS. 12A–12D for clarity.

It is pointed out that in the second orientation as illustrated, the edge 118 of the shoe 110 is close to, but not necessarily in contact with, the recipient 206. For many labeling applications it is preferable for the edge 118 to be as close to the recipient 206 as is feasible, without actual contact between the edge 118 and the recipient 206. However, this is exemplary only. Different spacings between the edge 118 of the shoe 110 and the recipient 206, including but not limited to direct contact between the edge 118 of the shoe 110 and the recipient 206, may be equally suitable.

FIG. 12C shows the shoe 110 still in its second orientation, with the edge 118 still laterally displaced in the direction of the second surface 116. However, the shoe 110 is now in its second position.

Having moved to the second position, the edge 118 of the shoe 110 is engaging the trailing or second edge 214 of the label 210, so that the entire label 210 has separated from the liner 216, and is applied to the recipient 206 by the translation of the shoe 110 from the first to the second position.

Although as illustrated herein, the translation between first and second positions by the shoe 110 is a vertical translation, this is exemplary only. Other arrangements may be equally suitable.

FIG. 12D shows the shoe 110 still in its second position. However, the shoe 110 has now pivoted back to its first orientation. As shown previously in FIG. 12A, in the first position the shoe 110 is well clear of the label recipient 206. Thus, the recipient feed mechanism 204 may feed the recipient 206 from the label receiving position without obstruction from the shoe 110.

The shoe 110 may be subsequently returned to the first position as shown in FIG. 12A. If the liner 216 is advanced so that another label 210 is in the label applying position, and if the recipient 206 is removed and replaced with another recipient 206, the label application process may be repeated as above.

Figure 11:
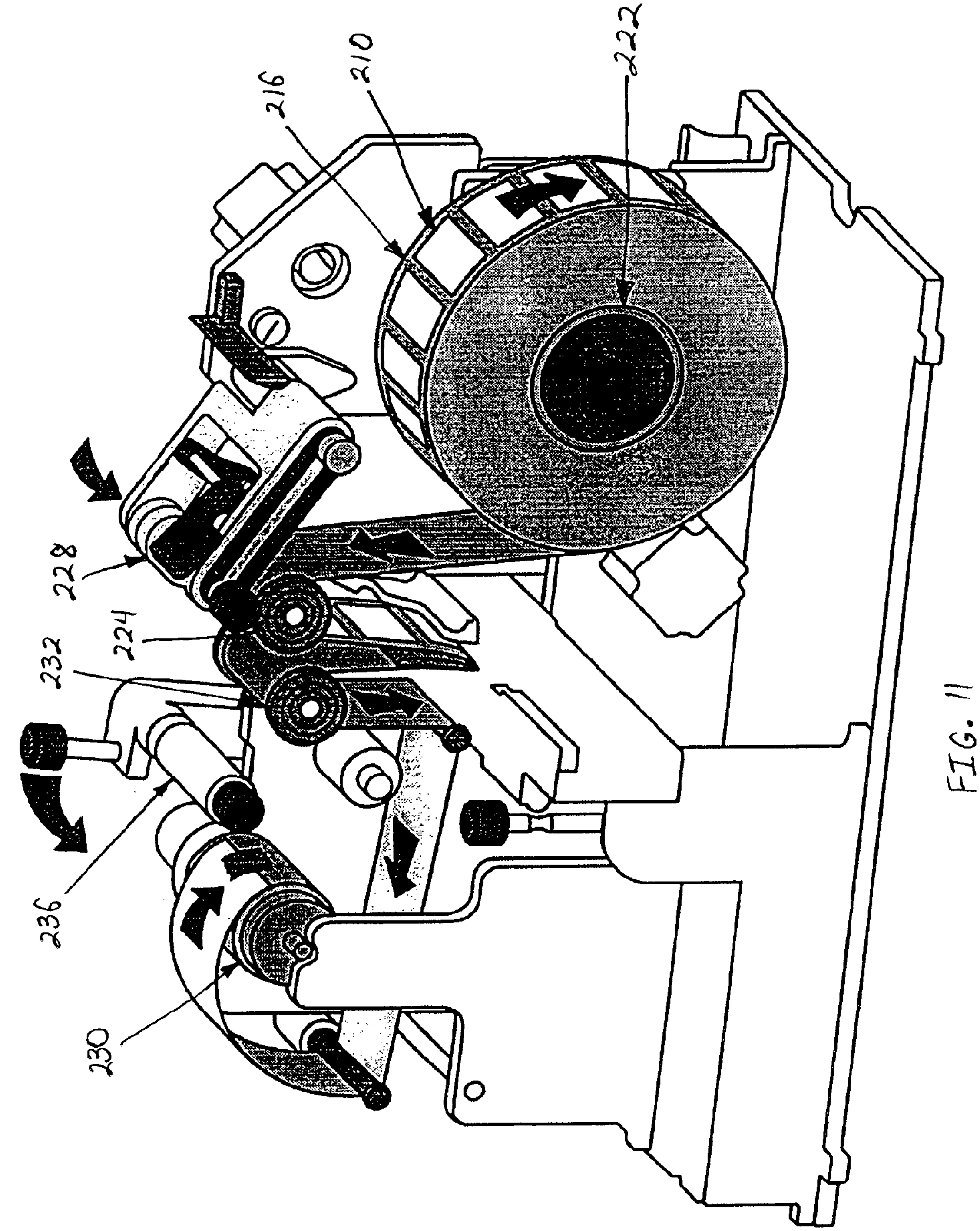
FIG. 11 is a perspective view of an exemplary embodiment of a label applicator module in accordance with the principles of the present invention with labels and liner in place.

As shown in FIG. 11, the liner 216 moves over guide roller 224, down and underneath the shoe 110, and then up and over guide roller 232. As previously noted, in some embodiments the guide roller 232 may translated with the shoe 110. In such an arrangement, the length of liner 216 between the edge 118 and the guide roller 232 remains constant when the shoe 110 translates between the first and second positions. Likewise, the length of the liner 216 between the supply spindle 222 and the take-up spindle 230 remains constant.

However, in other arrangements the guide roller 232 may for example be fixed. In this instance, the motions of the shoe 110 shown in FIGS. 12A–12D will require that the liner 216 must move between at least some of the steps shown therein.

Between FIGS. 12A and 12B the liner 216 moves only slightly, if at all. Likewise between FIGS. 12C and 12D. However between FIGS. 12B and 12C, the length of liner 216 between guide rollers 224 and 232 decreases significantly if guide roller 232 is fixed.

In the exemplary embodiment illustrated, this may be accommodated by locking the pinch roller 228 in place, for example by stopping the supply actuator 226. As the shoe 110 rises, the label 210 rises with it as it is applied to the recipient 206, and the empty liner 216 is drawn up by the capstan roller 236 onto the take-up spindle 230.

Additionally, if the label application process is repeated, the length of liner 216 between guide rollers 224 and 232 increases significantly between FIG. 12D and FIG. 12A.

Assuming the use of a fixed guide roller 232 in the exemplary embodiment illustrated, this may be accommodated by locking the capstan roller 236 in place, for example by stopping the take-up actuator 234, or by merely continuing to run the capstan roller 236 to prevent empty liner 216 from being drawn backwards past the edge 118 of the shoe 110, etc. As the shoe 110 falls, the liner 216 with labels 210 thereon is pulled down from the direction of guide roller 224, as dispensed from the supply spindle 222. However, such an arrangement is exemplary only.

In embodiments wherein the guide roller 232 is fixed with respect to the shoe 110 and does not translate therewith, it likewise may be suitable for the pinch roller 228 and/or the capstan roller 236 to be lockable, and/or to arrange for stoppage of the take-up actuator 234, for example to control movement of the liner 216 and the labels 210 thereon, whether during translation and/or pivoting of the shoe 110 or during other processes.

In embodiments of the module 200 having a registration sensor 156, the registration sensor 156 may be used to control the pinch roller 228, i.e. by controlling the supply actuator 226. Such an arrangement is shown in FIG. 15.

Figure 15:
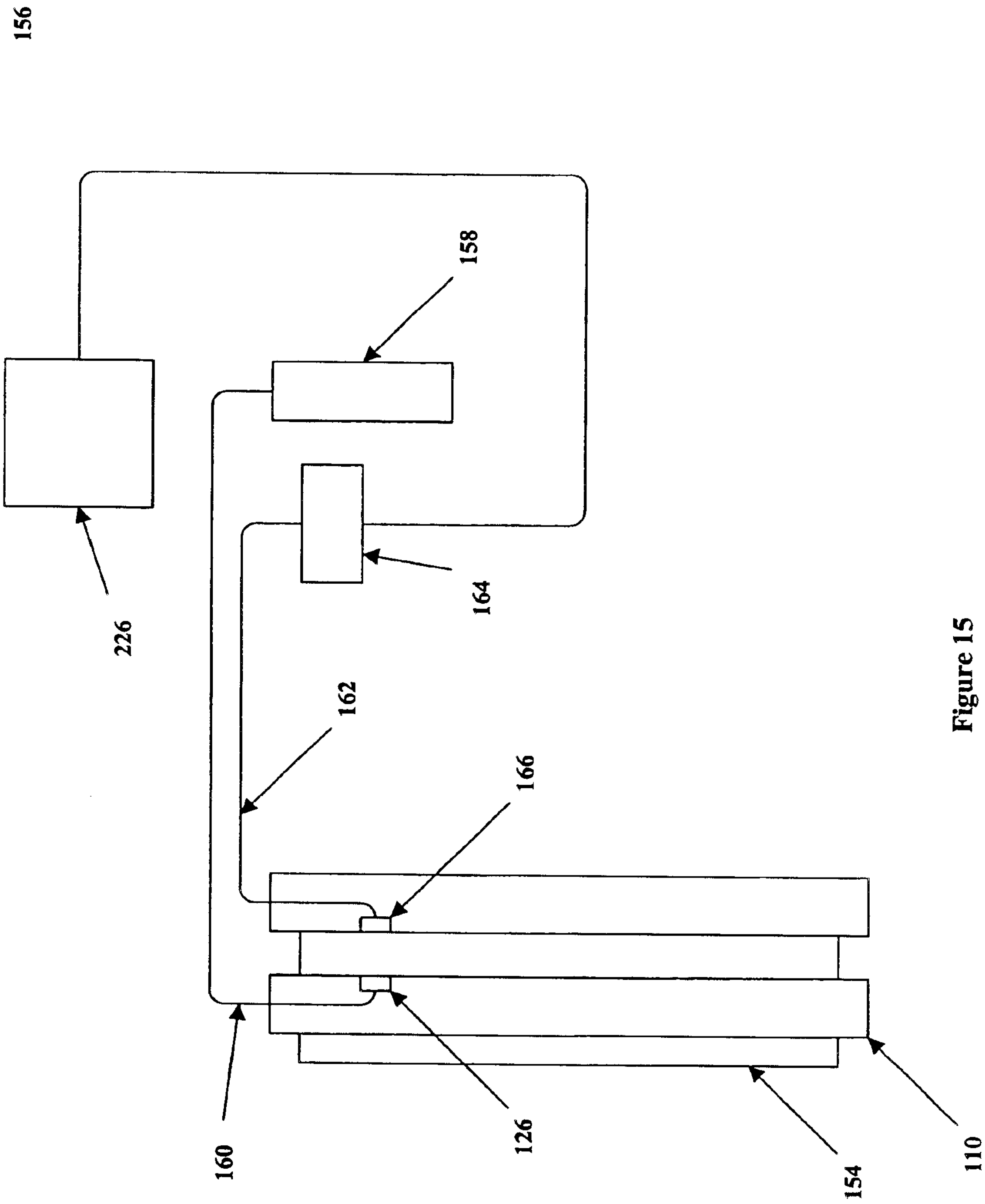
FIG. 15 is a schematic illustration showing a registration sensor.

FIG. 15 shows a registration sensor 156 similar to that in FIG. 8, and arranged in a similar fashion. However, in addition, in FIG. 15 the intensity detector 164 is in communication with the supply actuator 226. In this fashion, the operation of the supply actuator 226, and consequently the feeding of labels 210 through the module 200 and their registration or alignment therein, can be controlled based on the position of one or more labels 210 near the shoe 110 as determined by the registration sensor 156. However, this is exemplary only. Other embodiments wherein a registration sensor 156 does not control the supply actuator 226, including but not limited to embodiments wherein a registration sensor 156 controls another component of the module 200 so as to control feeding and/or registration of labels 210 in the module 200, may be equally suitable.

Returning to FIG. 11, it will be appreciated that since even in an arrangement with a fixed guide roller 232, wherein the length of liner both between guide rollers 224 and 232 and between the supply spindle 222 and the take-up spindle 230 changes as the shoe 110 translates, neither the capstan roller 236 nor the pinch roller 228 are required to move backwards. Therefore, the motors or other actuators used for the take-up actuator 234 and supply actuator 226 may be unidirectional.

Likewise, with a guide roller 232 that translates with the shoe 110, the take-up actuator 234 and supply actuator 226 may be unidirectional.

In addition, it is not necessary to actuate any other elements of the supply mechanism and take-up mechanism individually, or the label feed mechanism as a whole, since the motions provided by unidirectional take-up and supply actuators 234 and 226 are sufficient for label application, whether a single label or many labels are applied.

An inspection of FIGS. 12A through 12D, in particular 12B and 12C, reveals that the stroke length of the shoe 110 between the first and second positions does not need to be any longer than the height of the label 210 itself.

At least in part because of the short stroke required for the shoe 110, and the simple feeding and application of labels 210, a module 200 in accordance with the principles of the present invention can achieve relatively high rates of labeling. Generally, the rate of labeling with a pivoting shoe 110 is higher than the rate otherwise would be with a conventional non-pivoting shoe. That is, more labels 210 are placed on more cards or other recipients 206, so that the total processing rate of a module 200 in accordance with the principles of the present invention is higher than would otherwise be the case.

In practice, sustained labeling rates of over 1200 recipients 206 and labels 210 per hour are achievable. For certain embodiments, sustained labeling rates of at least 3000 recipients 206 and labels 210 per hour are achievable.

In addition, the short stroke required for the shoe 110, the simple feeding and application of labels 210, and the avoidance of a need for the liner 216 to move backwards or otherwise in a complex pattern, contributes to increased accuracy of placement of labels 210 on recipients 206. Generally, the accuracy of label 210 placement on the recipients 206 with a pivoting shoe 110 is greater than the accuracy otherwise would be with a conventional non-pivoting shoe. That is, the expected range of variation in position of the labels 210 on the recipients 206 is smaller for a module 200 in accordance with the principles of the present invention is higher than would otherwise be the case, and the expected number of labels 210 that are positioned unacceptably on the recipients 206 likewise is smaller.

In certain embodiments, the stroke length may be adjustable to accommodate labels 210 of different heights. Likewise, the settings of the various elements of the label feed mechanism may be adjustable to accommodate labels 210 of different widths. Additionally, the spacing between the edge 118 of the shoe 110 and the recipient 206 when the shoe 110 is in the second orientation may be adjustable to accommodate labels of different thicknesses.

The module 200 may also be adapted to translated the shoe 110 to a third position, in addition to the first and second positions already described. For example, the translation actuator 202 may be adapted to move the shoe 110 to the third position. Such a third position is illustrated in FIGS. 14A–14C in comparison to the first and second positions.

Figures 14A, 14B, 14C, 14D:
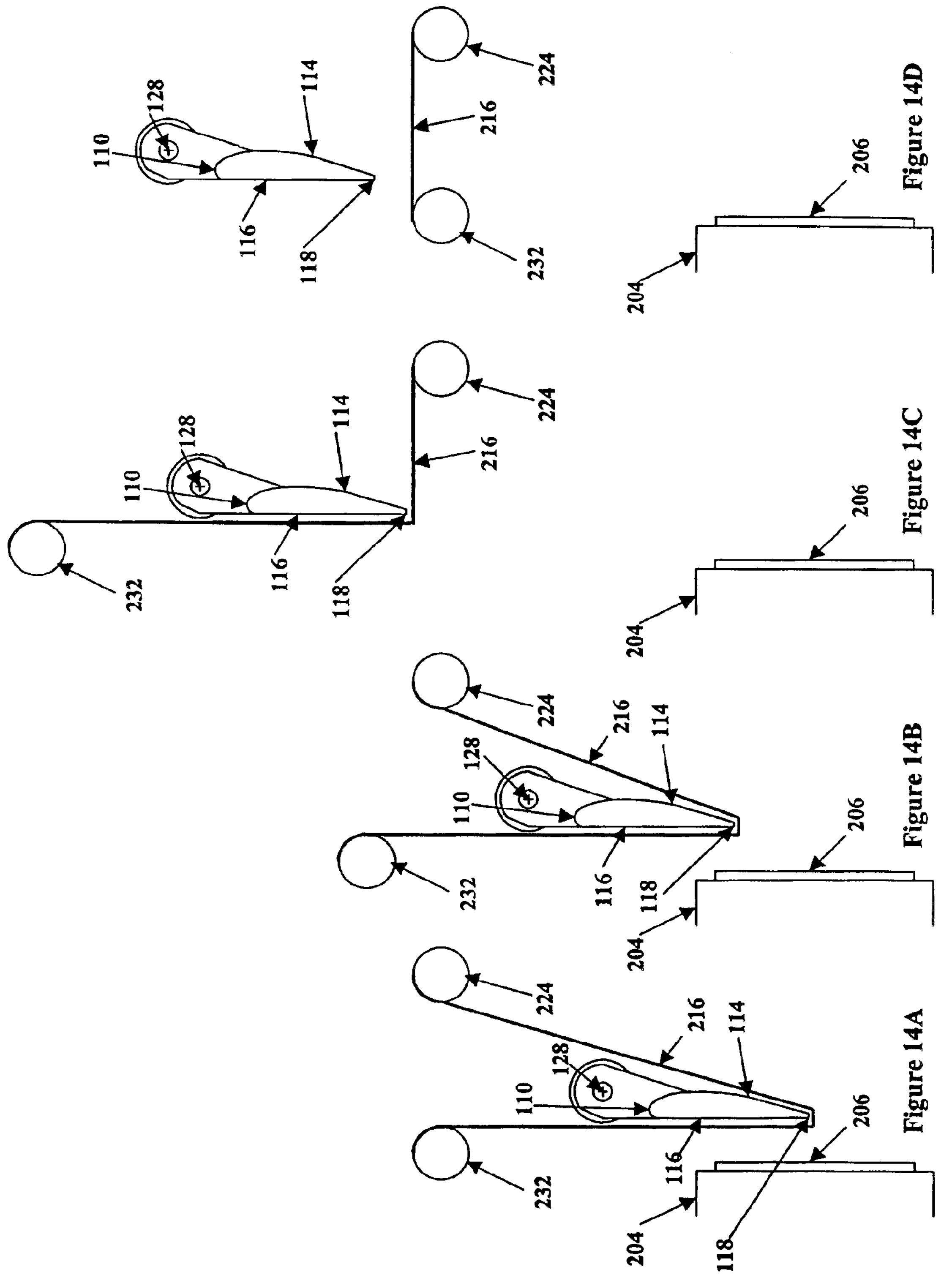
FIG. 14 is a schematic illustration showing a shoe in accordance with the principles of the present invention in first, second, and third positions.

FIGS. 14A and 14B show the shoe 110 in the first and second positions, respectively. They therefore show an arrangement similar to that shown in FIGS. 12A and 12D, and described with regard to those illustrations. A portion of the recipient feed mechanism 204 is included for reference. However, although in some cases there may be labels 210 present on the liner 216 or a recipient 206 present on the recipient feed mechanism 204 when the shoe is in the first and second positions, those elements are omitted here for clarity.

FIG. 14C shows the shoe 110 in an exemplary third position, wherein the guide roller 232 translates with the shoe 110. In the third position as illustrated therein, the shoe 110 is disposed well above the path that the liner 216 follows between guide rollers 224 and 232 in either the first or the second position. As may be seen from FIG. 11, while in the first and second positions, the shoe 110 is positioned so that it is necessary to thread the liner 216 in a serpentine fashion around the shoe 110. That is, the shoe 110 itself poses an obstacle to the loading of the liner 216 with the labels 210 thereon. However, in the third position the shoe 110 is sufficiently elevated that it is not an obstruction to loading. Thus the third position, in embodiments that include it, may be useful at least for loading the module with labels 210.

FIG. 14D shows the shoe 110 in another exemplary third position, wherein the guide roller 232 is fixed with respect to the shoe 110. In the third position as illustrated therein, the shoe 110 is disposed above a straight path between guide rollers 224 and 232. Again, while in the first and second positions, the shoe 110 obstructs this simple loading path, making it necessary to thread the liner 216 around the shoe 110, in the third position the shoe 110 does not so obstruct the loading path. Thus the third position, in embodiments that include it, may be useful at least for loading the module with labels 210.

It is noted that both of the third positions illustrated in FIGS. 14C and 14D are exemplary only. Although in both cases the shoe 110 is illustrated as translating so far that the edge 118 thereof is above the top of guide roller 224, this is not required. Greater or lesser translations than those shown may be equally suitable for removing the shoe 110 as an obstacle, leaving a convenient non-serpentine loading path.

It is noted that, although the label applying module as described herein is suited for stand-alone use, label modules in accordance with the principles of the present invention may be suitable for incorporation into larger assemblies, including but not limited to an integrated card processing system.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A label affixer shoe for applying a label to a recipient, comprising:

an application blade comprising an edge, a first surface, and a second surface, said shoe is translatable between a first position and a second position;

a pivot connected to said blade, said pivot defining a pivot axis therethrough;

wherein:

said pivot is arranged such that at least said blade of said shoe is pivotable about said pivot axis between a first orientation and a second orientation, where movement between said first and second orientations defining a movement that is independent from said movement between said first and second positions;

pivoting said blade from said first to said second orientation causes a lateral displacement of said edge in a direction of said second surface;

said first surface, said edge, and said second surface are configured so as to separate a label from a liner at said edge when said label and said liner are moved with respect to said blade from said first surface past said edge toward said second surface, and wherein said blade and said shoe are arranged such that when said blade is in said first orientation and said shoe is in one of said first or second positions, said blade and shoe do not obstruct motion of said label recipient to or from a label receiving position, and when said label recipient is in label receiving position, said blade is in said second orientation, and said shoe is in said first position, said edge engages a first edge of said label with said label recipient, and when said shoe has translated to said second position with said blade in said second orientation, said edge engages a second edge of said label with said label recipient, such that a translation of said shoe from said first position to said second position while said blade is in said second orientation applies said label to said label recipient.

2. The shoe according to claim 1, wherein: said first surface is convex.

3. The shoe according to claim 1, wherein: said second surface is planar.

4. The shoe according to claim 1, wherein: said pivot comprises a cylinder projecting from said shoe parallel with said second surface.

5. The shoe according to claim 1, wherein: said shoe further comprises a stop arranged so as to limit a range between said first and second orientations.

6. The shoe according to claim 5, wherein: said stop comprises a cylinder projecting from said shoe parallel with said pivot axis.

7. The shoe according to claim 5, wherein: said stop is arranged such that said range between said first and second positions is at least 5 degrees.

8. The shoe according to claim 5, wherein: said stop is arranged such that said range between said first and second positions is at least 10 degrees.

9. The shoe according to claim 1, wherein: said shoe comprises a linking body, with said blade and said pivot being attached to said linking body.

10. The shoe according to claim 1, wherein: said shoe comprises at least a portion of a registration sensor for registering a position of said label.

11. The shoe according to claim 10, wherein: said sensor comprises a light pipe head disposed on said shoe.

12. The shoe according to claim 11, wherein: said light pipe head is disposed on said blade.

13. A label affixer carriage, comprising:

an affixer shoe comprising:

an application blade comprising an edge, a first surface, and a second surface, said shoe is translatable between a first position and a second position;

a pivot connected to said blade, said pivot defining a pivot axis therethrough;

said pivot is arranged such that at least said blade of said shoe is pivotable about said pivot axis between a first orientation and a second orientation, where movement between said first and second orientations defining a movement that is independent from movement between said first and second positions;

pivoting said blade from said first to said second orientation causes a lateral displacement of said edge in a direction of said second surface; and said first surface, said edge, and said second surface are configured so as to separate a label from a liner at said edge when said label and said liner are moved with respect to said blade from said first surface past said edge toward said second surface; and a pivot actuator for pivoting said blade between said first and second orientations;

wherein said blade and said shoe are arranged such that when said blade is in said first orientation and said shoe is in one of said first or second position, said blade and shoe do not obstruct motion of said label recipient to or from a label receiving position, and when said label recipient is in a label receiving position, said blade is in said second orientation, and said shoe is in said first position, said edge engages a first edge of said label with said label recipient, and when said shoe has translated to said second position with said blade in said second orientation, said edge engages a second edge of said label with said label recipient, such that a translation of said shoe from said first position to said second position while said blade is in said second orientation applies said label to said label recipient.

14. The carriage according to claim 13, wherein: said shoe further comprises a stop arranged so as to limit a range between said first and second orientations.

15. The carriage according to claim 14, wherein: said carriage comprises a biasing mechanism for applying pressure to said label in direction from said first surface to said second surface of said shoe.

16. The carriage according to claim 15, wherein: said biasing mechanism is engaged with said shoe and moves therewith.

17. The carriage according to claim 15, wherein: said biasing mechanism comprises a brush.

18. The carriage according to claim 13, wherein: said carriage comprises at least a portion of a label registration sensor for registering a position of said label.

19. The carriage according to claim 18, wherein: at least a portion of said registration sensor is disposed on said shoe.

20. The carriage according to claim 18, wherein: at least a portion of said registration sensor is disposed on said blade.

21. The carriage according to claim 18, wherein: said registration sensor comprises a light source, first and second light pipes, and an intensity detector.

22. The carriage according to claim 21, wherein: a head of one of said light pipes is disposed on said blade.

23. The carriage according to claim 13, wherein: said pivot actuator comprises a solenoid.

24. The carriage according to claim 13, wherein: said carriage further comprises a guide roller operatively connected with said shoe, said guide roller moving a liner and label past said edge of said blade during the translation of said shoe from said first position to said second position.

25. A label affixer module, comprising:

an affixer shoe comprising:

an application blade comprising an edge, a first surface, and a second surface;

a pivot connected to said blade, said pivot defining a pivot axis therethrough;

wherein:

said pivot is arranged such that at least said blade of said shoe is pivotable about said pivot axis between a first orientation and a second orientation;

pivoting said blade from said first to said second orientation causes a lateral displacement of said edge in a direction of said second surface; and said first face, said edge, and said second face are configured so as to separate a label from a liner at said edge when said label and said liner are moved with respect to said blade from said first face past said edge toward said second face to separate from said liner at said edge;

a pivot actuator for pivoting said blade between said first and second orientations;

a translation actuator for translating said shoe between a first position and a second position, where movement between said first and second orientations defining a movement that is independent from movement between said first and second positions;

a recipient feed mechanism for delivering a label recipient to a label receiving position proximate said second side of said blade; and a label feed mechanism for delivering said label on said liner to a label applying position proximate said first side of said blade;

wherein said shoe, said label receiving position, and said label applying position are arranged such that:

when said blade is in said first orientation and said shoe is in one of said first or second positions, said blade and shoe do not obstruct motion of said label recipient within said recipient feed mechanism to or from said label receiving position;

when said recipient is in said label receiving position, said label is in said label applying position, said blade is in said second orientation, and said shoe is in said first position, said edge engages a first edge of said label with said recipient, and when said shoe has moved to said second position with said blade in said second orientation, said edge engages a second edge of said label with said recipient, such that a translation of said shoe from said first position to said second position while said blade is in said second orientation applies said label to said recipient.

26. The label module according to claim 25, wherein: said shoe further comprises a stop arranged so as to limit a range between said first and second orientations.

27. The label module according to claim 25, wherein: said stop is arranged such that said range between said first and second positions is at least 5 degrees.

28. The label module according to claim 25, wherein: said stop is arranged such that said range between said first and second positions is at least 10 degrees.

29. The label module according to claim 25, wherein: said label module comprises a biasing mechanism for applying pressure to said label in said direction of said recipient.

30. The label module according to claim 29, wherein: said biasing mechanism is engaged with said shoe and moves therewith.

31. The label module according to claim 29, wherein: said biasing mechanism comprises a brush.

32. The label module according to claim 25, wherein: said carriage comprises a label registration sensor for registering a position of said label.

33. The label module according to claim 32, wherein: as least a portion of said registration sensor is disposed on said shoe.

34. The label module according to claim 32, wherein: at least a portion of said registration sensor is disposed on said blade.

35. The label module according to claim 32, wherein: said registration sensor comprises a light source, first and second light pipes, and an intensity detector.

36. The label module according to claim 35, wherein: a head of one of said light pipes is disposed on said blade.

37. The label module according to claim 32, wherein: said registration sensor is in communication with said label feed mechanism, such that said label feed mechanism feeds said label to said label applying position in response to said registration sensor.

38. The label module according to claim 25, wherein: a distance of said translation between said first and second positions of said shoe is not more than a height of said label.

39. The label module according to claim 25, wherein: said label feed mechanism comprises a supply mechanism for supplying said label and said liner, and a take-up mechanism for taking up said liner for said label after said label is separated therefrom.

40. The label module according to claim 39, wherein: said supply mechanism comprises not more than one supply actuator for supplying said label.

41. The label module according to claim 40, wherein: said supply actuator comprises a unidirectional motor.

42. The label module according to claim 39, wherein: said take-up mechanism comprises not more than one take-up actuator for taking up said liner.

43. The label module according to claim 42, wherein: said take-up actuator comprises a unidirectional motor.

44. The label module according to claim 39, wherein: said supply mechanism comprises a supply spindle for dispensing a roll comprising a plurality of said labels disposed on said liner.

45. The label module according to claim 39, wherein: said supply mechanism comprises:

a guide roller for guiding said liner with said label thereon;

a supply actuator;

a pinch roller actuated by said supply actuator, said pinch roller being engaged with said guide roller to draw said label and said liner toward said shoe.

46. The label module according to claim 45, wherein: said guide roller is unpowered.

47. The label module according to claim 39, wherein: said take-up mechanism comprises a take-up spindle for taking up said liner.

48. The label module according to claim 39, wherein: said take-up mechanism comprises:

a guide roller for guiding said liner;

a take-up actuator;

a capstan roller actuated by said take-up actuator, said capstan roller being engaged with said liner to draw said liner from said shoe.

49. The label module according to claim 48, wherein: said guide roller is unpowered.

50. The label module according to claim 25, wherein: said pivot actuator comprises a solenoid.

51. The label module according to claim 25, wherein: said translation actuator comprises an electric motor.

52. The label module according to claim 25, wherein: said translation actuator is adapted to move said shoe between said first and second positions and a third position.

53. The label module according to claim 52, wherein: when said shoe is in said third position, said shoe is not disposed in a loading path of said label feed mechanism.

54. The label module according to claim 25, wherein: said recipient is planar in shape.

55. The label module according to claim 25, wherein: said recipient is a card.

56. The label module according to claim 25, wherein: said module has a rate of labeling said recipients that is more than 1200 labels per hour.

57. The label module according to claim 25, wherein: said module has a rate of labeling said recipients that is at least 3000 labels per hour.

58. The label module according to claim 25, wherein: a higher rate of labeling said recipients is enabled with said pivotable blade than with a non-pivotable blade.

59. The label module according to claim 25, wherein: a greater accuracy of label placement on said recipient is enabled with said pivotable blade than with a non-pivotable blade.

60. The label module according to claim 25, wherein: a label affixer carriage comprising a guide roller operatively connected with said shoe, said guide roller moving a liner and label part said edge of said blade when translating said shoe from said first position to said second position.

* * * * *